(12) United States Patent
Yamakami et al.

(10) Patent No.: US 8,123,846 B2
(45) Date of Patent: Feb. 28, 2012

(54) INK JET INK, INK JET RECORDING METHOD, INK CARTRIDGE, RECORDING UNIT AND INK JET RECORDING APPARATUS

(75) Inventors: Hideki Yamakami, Kawasaki (JP); Hiroshi Tomioka, Tokyo (JP); Daiji Okamura, Yokohama (JP); Mitsuru Ishii, Kamagaya (JP); Satoshi Kudo, Kawasaki (JP); Otome Mori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 327 days.

(21) Appl. No.: 12/389,934

(22) Filed: Feb. 20, 2009

(65) Prior Publication Data

US 2009/0238975 A1 Sep. 24, 2009

(30) Foreign Application Priority Data

Mar. 19, 2008 (JP) ................................. 2008-072277

(51) Int. Cl.
*C09D 11/02* (2006.01)
(52) U.S. Cl. ................ 106/31.48; 106/31.47; 106/31.58
(58) Field of Classification Search ............... 106/31.48, 106/31.58, 31.47; 347/100; 427/256
See application file for complete search history.

(56) References Cited

U.S. PATENT DOCUMENTS

| | | | | |
|---|---|---|---|---|
| 4,301,070 A | 11/1981 | Giles et al. | | 260/155 |
| 4,723,129 A | 2/1988 | Endo et al. | | 346/1.1 |
| 4,740,796 A | 4/1988 | Endo et al. | | 346/1.1 |
| 4,840,674 A * | 6/1989 | Schwarz | | 106/31.43 |
| 5,169,436 A * | 12/1992 | Matrick | | 106/31.58 |
| 5,446,136 A | 8/1995 | Pape et al. | | 534/753 |
| 5,540,764 A * | 7/1996 | Haruta et al. | | 106/31.58 |
| 6,398,355 B1 * | 6/2002 | Shirota et al. | | 347/100 |
| 6,474,803 B1 * | 11/2002 | Shirota et al. | | 347/100 |
| 6,863,719 B2 * | 3/2005 | Butler et al. | | 106/31.48 |
| 7,144,452 B2 | 12/2006 | Takayama et al. | | 106/31.52 |
| 7,160,372 B2 | 1/2007 | Yoshizawa et al. | | 106/31.47 |
| 7,198,664 B2 | 4/2007 | Mafune et al. | | 106/31.28 |

(Continued)

FOREIGN PATENT DOCUMENTS

CN 1646643 A 7/2005

(Continued)

OTHER PUBLICATIONS

Jun. 30, 2009 European Official Action in European Patent Appln. No. 09154757.0.

(Continued)

*Primary Examiner* — Helene Klemanski
(74) *Attorney, Agent, or Firm* — Fitzpatrick, Cella, Harper & Scinto

(57) ABSTRACT

An ink jet ink providing an image having excellent lightfastness and having sticking resistance and intermittent ejection stability. The ink jet ink is characterized by containing at least a compound represented by the following general formula (I) and a compound represented by the following general formula (II).

General formula (I)

$[A]-N=N-\overset{[C]=[B]}{\underset{[D]}{\bigg|}}-N\overset{R_5}{\underset{R_6}{\diagdown}}$ General formula (II)

$R_x-[E]-R_y$

11 Claims, 6 Drawing Sheets

U.S. PATENT DOCUMENTS

| | | | |
|---|---|---|---|
| 7,198,665 B2 | 4/2007 | Nakamura et al. | 106/31.52 |
| 7,201,791 B2 | 4/2007 | Okamura et al. | 106/31.47 |
| 7,208,033 B2 | 4/2007 | Kawabe et al. | 106/31.48 |
| 7,244,299 B2 | 7/2007 | Tsuji et al. | 106/31.48 |
| 7,247,194 B2 | 7/2007 | Okamura et al. | 106/31.47 |
| 7,247,196 B2 | 7/2007 | Sato et al. | 106/31.52 |
| 7,270,701 B2 | 9/2007 | Jinnou et al. | 106/31.47 |
| 7,297,197 B2 | 11/2007 | Jinnou et al. | 106/31.47 |
| 7,404,851 B2 | 7/2008 | Arai | |
| 7,416,592 B2 | 8/2008 | Kitamura et al. | |
| 7,533,978 B2 | 5/2009 | Chino et al. | |
| 7,550,037 B2 * | 6/2009 | Mafune et al. | 106/31.48 |
| 7,553,358 B2 | 6/2009 | Okamura et al. | 106/31.48 |
| 7,566,362 B2 | 7/2009 | Mori et al. | 106/31.48 |
| 7,618,484 B2 * | 11/2009 | Fujimoto et al. | 106/31.48 |
| 7,682,433 B2 * | 3/2010 | Yanagimachi et al. | 106/31.6 |
| 2004/0246321 A1 | 12/2004 | Takashima et al. | |
| 2006/0009357 A1 | 1/2006 | Fujiwara et al. | 503/227 |
| 2007/0148376 A1 | 6/2007 | Tomioka et al. | 428/32.1 |
| 2007/0176991 A1 * | 8/2007 | Arai | 106/31.48 |
| 2008/0018722 A1 | 1/2008 | Mafune et al. | 347/100 |
| 2008/0151028 A1 | 6/2008 | Yamakami et al. | 347/100 |
| 2008/0274284 A1 | 11/2008 | Fujimoto et al. | 427/256 |
| 2008/0274286 A1 | 11/2008 | Yamashita et al. | 427/256 |
| 2008/0280041 A1 | 11/2008 | Nishino et al. | 427/256 |
| 2008/0280042 A1 | 11/2008 | Yanagimachi et al. | 427/256 |
| 2008/0280043 A1 | 11/2008 | Moribe et al. | 427/256 |
| 2008/0280044 A1 | 11/2008 | Okamura et al. | 427/258 |
| 2009/0011130 A1 * | 1/2009 | Mafune et al. | 106/31.48 |
| 2009/0047430 A1 * | 2/2009 | Mori et al. | 106/31.48 |
| 2009/0238977 A1 * | 9/2009 | Kawabe et al. | 427/256 |
| 2009/0274840 A1 * | 11/2009 | Yamakami et al. | 427/256 |

FOREIGN PATENT DOCUMENTS

| | | |
|---|---|---|
| CN | 101298526 A | 11/2008 |
| DE | 43 43 454 | 6/1995 |
| EP | 1 988 134 | 11/2008 |
| EP | 1 990 383 | 11/2008 |
| JP | 07-278476 A | 10/1995 |
| JP | 10-60347 | 3/1998 |
| JP | 2003-192930 A | 7/2003 |
| JP | 2007-204632 A | 6/2004 |
| JP | 2004-299373 A | 10/2004 |
| JP | 2005-119220 A | 5/2005 |
| JP | 2005-126587 A | 5/2005 |
| JP | 2005-139427 A | 6/2005 |
| JP | 2005-212172 A | 8/2005 |
| JP | 2006-143989 | 6/2006 |
| JP | 2007-302811 A | 11/2007 |
| WO | WO 2004/113463 | 12/2004 |

OTHER PUBLICATIONS

Office Action dated Jul. 12, 2011 in counterpart Japanese Patent Application No. 2009-030608.

Office Action dated Jul. 12, 2011 in counterpart Chinese Patent Application No. 200910129240.

* cited by examiner

INK JET INK, INK JET RECORDING METHOD, INK CARTRIDGE, RECORDING UNIT AND INK JET RECORDING APPARATUS

BACKGROUND OF THE INVENTION

1. Field of the Invention

The present invention relates to an ink jet ink, an ink jet recording method, an ink cartridge, a recording unit and an ink jet recording apparatus.

2. Description of the Related Art

The ink jet recording method is a recording method for forming an image by applying small ink droplets onto recording mediums such as plain paper and glossy medium. Because of cost reduction and improvement of recording speed, the ink jet recording method has been quickly and widely used. Furthermore, the quality of the images obtained by the ink jet recording method has been improved and, in addition, digital cameras have been rapidly put in use. Accordingly, the ink jet recording method is generally and widely used as a method of outputting an image corresponding to silver halide photography.

Recently, the size of ink droplets ejected by an ink jet system has been reduced extremely small and a color range has been improved by introduction of ink of multiple colors. By virtue of this, the quality of the images obtained by the ink jet recording method has been much improved than ever. However, on the other hand, demands for coloring materials and ink have been more significant. Demands for properties thereof including color developability, clogging and reliability such as ejection stability have been more stringent. In particular, ink to be applied to the ink jet recording system, in which recording is performed by ejecting ink from a recording head by the action of thermal energy, is required to have the following properties: such as a property of preventing kogation of a recording head and a property of preventing wire breakage of a heater even if a predetermined number of electric pulses are applied, in short, required to have excellent recording durability.

Furthermore, the ink jet recording method has a problem in that fastness properties (image retainability) of the obtained image may not be sufficient. Generally, the image obtained by the ink jet recording method is not kept longer compared to a silver halide photograph. To be more specifically, when an image recorded is exposed to light, moisture, heat and ambient gas present in the air for a long time, the coloring material of the image deteriorates and problems such as color tone change and color fading of the image are likely to occur. Particularly, fastness properties of an image recorded by use of ink containing a dye as a coloring material are problems. Of them, in view of lightfastness, low lightfastness due to a chemical reaction intrinsic to the coloring material is a problem. Of color inks such as cyan, magenta and yellow frequently used in the ink jet recording method, magenta ink tends to have low image fastness properties. With respect to magenta ink, studies have been mostly conducted on dye thereof.

To solve the lightfastness problem, thereby improving the lightfastness of an image, a number of proposals have been so far made in the art. For example, there is a proposal on magenta dye having a specific azo structure with high fastness properties and high color-developing property (see Japanese Patent Application Laid-Open No. 2006-143989).

Furthermore, for the purpose of improving reliability of ink to be applied to the ink jet recording method, there is a proposal that bis(2-hydroxyethyl)sulfone is added to ink (see Japanese Patent Application Laid-Open No. H10-60347).

SUMMARY OF THE INVENTION

As the quality of an image by ink jet recording increases, the requisite level of fastness properties of image has been increased. Then, the present inventors conducted studies on ink containing a magenta dye described in Japanese Patent Application Laid-Open No. 2006-143989 above. However, it was found that the fastness properties of the image obtained herein did not reach the level recently demanded. The present inventors also conducted studies to improve the fastness properties of an image to be recorded by use of the magenta dye-containing ink by using a compound conventionally known to improve the fastness properties of an image. However, it was found that the use of such a compound and the magenta dye in combination raises new problems described below.

First, it was found that clogging of ink occurs at the ejection port of a recording head; in other words, sticking resistance of ink is insufficient. In addition to this problem, when an ink jet recording apparatus is allowed to stand still without ejecting ink for a predetermined time, moisture vaporizes from ink through an ejection port. As a result, ink is not normally ejected, in other words, an intermittent ejection stability of ink is not sufficiently obtained.

Accordingly, an object of the present invention is to provide ink jet ink, which forms an image (recorded by the ink) having excellent lightfastness and which has excellent sticking resistance and intermittent ejection stability. Another object of the present invention is to provide ink jet ink having excellent recording durability even if the ink is applied to an ink jet recording system in which ink is ejected by the action of thermal energy, and having a color tone that can be used as magenta ink. Another object of the present invention is to provide an ink jet recording method, an ink cartridge, a recording unit, and an ink jet recording apparatus capable of stably providing an image having excellent lightfastness and high storage stability by use of the ink jet ink.

The aforementioned objects can be attained by the present invention as described below. More specifically, the present invention is directed to ink jet ink characterized by containing at least a compound represented by the following general formula (I) and a compound represented by the following general formula (II):

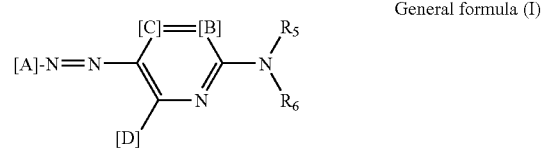

General formula (I)

wherein, in general formula (I), [A] is a 5-membered heterocyclic group; [B] and [C] are $CR_1$ and $CR_2$ or one of [B] and [C] is a nitrogen atom and the other is $CR_1$; and $R_5$ and $R_6$ are each independently a hydrogen atom or a substituent selected from the group including an aliphatic group, an aromatic group, a heterocyclic group, an acyl group, an alkoxycarbonyl group, an aryloxycarbonyl group, a carbamoyl group, an alkylsulfonyl group, an arylsulfonyl group and a sulfamoyl group; a hydrogen atom of the substituent may be substituted; furthermore, $R_1$ and $R_2$ that can partly constitute [D], [B] and [C] in the formula are each independently a hydrogen atom or a substituent selected from the group including a halogen atom, an aliphatic group, an aromatic group, a heterocyclic group, a cyano group, a carboxy group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, and a sulfonic acid group; a hydrogen atom of the substituent may be substituted and $R_1$ and $R_5$ or $R_5$ and $R_6$ may be joined to form a 5-membered ring or a 6-membered ring); and $$R_x\text{-}[E]\text{-}R_y \qquad \text{General formula (II)}$$

wherein, in general formula (II), -[E]- is —S—, —S(=O)— or —S(=O)$_2$—; $R_x$ and $R_y$ are each independently one selected from the group including a hydrogen atom, a hydroxyl group, an alkyl group, a hydroxyalkyl group, an alkenyl group, an acyl group, a carbamoyl group, a carboxy group and a sulfonyl group, with the proviso that $R_x$ and $R_y$ may not simultaneously take hydrogen atoms or hydroxyl groups or an hydrogen atom and a hydroxyl group.

Furthermore, according to another aspect of the present invention, there is provided an ink jet recording method for recording an image by ejecting ink by an ink jet system, in which the ink is the ink jet ink having the aforementioned constitution.

Furthermore, according to another aspect of the present invention, there is provided an ink cartridge provided with an ink storage portion for storing ink, in which the ink is the ink jet ink having the aforementioned constitution.

Furthermore, according to another aspect of the present invention, there is provided a recording unit having an ink storage portion for storing ink and a recording head for ejecting ink, in which the ink is the ink jet ink having the aforementioned constitution.

Furthermore, according to another aspect of the present invention, there is provided an ink jet recording apparatus having an ink storage portion for storing ink and a recording head for ejecting ink, in which the ink is the ink jet ink having the aforementioned constitution.

According to the present invention, it is possible to provide ink jet ink which forms an image having excellent lightfastness and which has excellent sticking resistance and intermittent ejection stability. Furthermore, according to another aspect of the present invention, it is possible to provide ink jet ink having excellent recording durability even if the ink is applied to an ink jet recording system in which ink is ejected by the action of thermal energy, and having the color tone that can be used as magenta ink. As another embodiment of the present invention, it is possible to provide an ink jet recording method, an ink cartridge, a recording unit, and an ink jet recording apparatus using the ink jet ink.

Further features of the present invention will become apparent from the following description of exemplary embodiments with reference to the attached drawings.

DESCRIPTION OF THE EMBODIMENTS

Figure 1:
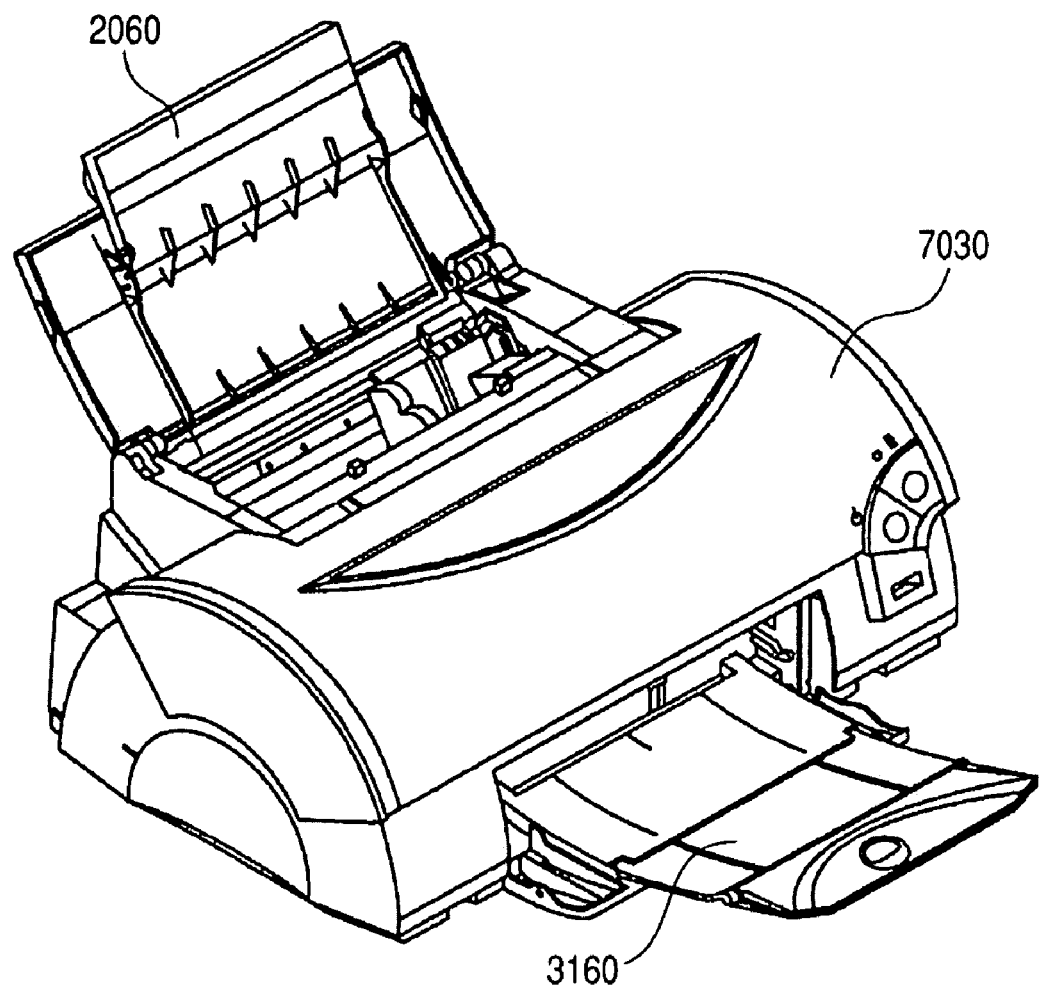
FIG. 1 is a perspective view of an ink jet recording apparatus.

The present invention will now be described in detail below with reference to exemplary embodiments. In the present invention, when a compound to be used is a salt, an expression of "salt is contained" is used for convenience, though at least a part of the salt is dissociated to be an ion in an ink. Furthermore, in the following description, compounds represented by the general formulas (I) to (III) may be sometimes described as "a compound of the general formula (I)", "a compound of the general formula (II)" and "a compound of the general formula (III)", respectively.

<Ink>

Now, components constituting the ink jet ink according to the present invention (hereinafter, sometimes simply referred to as "ink") and physical properties of the ink will be more specifically described.

As a result of the studies conducted by the present inventors, it was found that when ink, which has a specific azo dye and a specific compound in combination, is used, the image that is recorded by the ink has excellent lightfastness, and that the ink has excellent sticking resistance and intermittent ejection stability. The present invention was on the basis of the findings and is characterized in that a specific azo dye and a specific compound are used in combination.

(Compound Represented by the General Formula (I))

It is necessary for the ink of the present invention to contain a compound of the following general formula (I) as a coloring material.

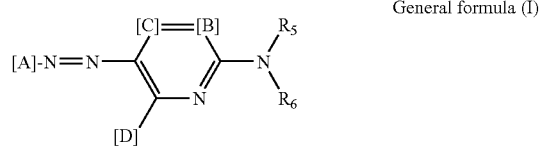

General formula (I)

wherein, in general formula (I), [A] is a 5-membered heterocyclic group; [B] and [C] are $CR_1$ and $CR_2$ or one of [B] and [C] is a nitrogen atom and the other is $CR_1$; and $R_5$ and $R_6$ are each independently a hydrogen atom or a substituent selected from the group including an aliphatic group, an aromatic group, a heterocyclic group, an acyl group, an alkoxycarbonyl group, an aryloxycarbonyl group, a carbamoyl group, an alkylsulfonyl group, an arylsulfonyl group and a sulfamoyl group; a hydrogen atom of the substituent may be substituted; furthermore, $R_1$ and $R_2$ that can partly constitute [D], [B] and [C] in the formula are each independently a hydrogen atom or a substituent selected from the group including a halogen atom, an aliphatic group, an aromatic group, a heterocyclic group, a cyano group, a carboxy group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, and a sulfonic acid group; a hydrogen atom of the substituent may be substituted and $R_1$ and $R_5$ or $R_5$ and $R_6$ may be joined to form a 5-membered ring or a 6-membered ring).

In the general formula (I), [A] is a residue of a 5-membered heterocyclic diazo component, [A]-NH$_2$. As the hetero atoms constituting the heterocyclic ring, N, O and S may be specifically mentioned. Of them, N can be contained in the 5-membered heterocyclic ring. Note that the heterocyclic ring may be joined with an aliphatic ring, an aromatic ring or other heterocyclic rings by condensation. Examples of the heterocyclic ring include a pyrazole ring, an imidazole ring, a thiazole ring, an isothiazole ring, a thiadiazole ring, a benzothiazole ring, a benzoxazole ring and a benzisothiazole ring. The heterocyclic group may further have a substituent. Of them, a pyrazole ring, an imidazole ring, an isothiazole ring, a thiadiazole ring or a benzothiazole ring represented by the following general formulas (1) to (6) can be used.

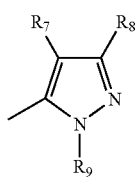

General formula (1)

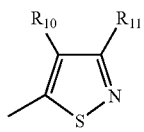

General formula (2)

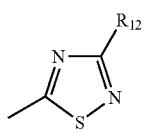

General formula (3)

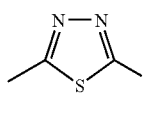

General formula (4)

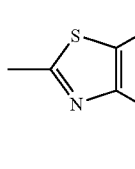

General formula (5)

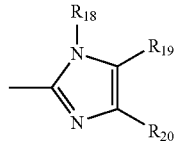

General formula (6)

In the general formulas (1) to (6), $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$ and $R_{20}$ represent the same elements as selected as $R_1$ and $R_2$ constituting a part of [D] in the general formula (I) previously described. Of the general formulas (1) to (6), a pyrazole ring or an isothiazole ring represented by the general formula (1) or the general formula (2) can be used and particularly, a pyrazole ring represented by the general formula (1) can be used.

In the general formula (I), [B] and [C] are $CR_1$ and $CR_2$ or one of [B] and [C] is a nitrogen atom and the other is $CR_1$, $R_5$ and $R_6$ are each independently a hydrogen atom or a substituent selected from the group described below. The group of the substituents includes an aliphatic group, an aromatic group, a heterocyclic group, an acyl group, an alkoxycarbonyl group, an aryloxycarbonyl group, a carbamoyl group, an alkylsulfonyl group, an arylsulfonyl group and sulfamoyl group. A hydrogen atom of the substituent may be substituted. $R_5$ and $R_6$ are any one selected from the group including a hydrogen atom, an aliphatic group, an aromatic group, a heterocyclic group, an acyl group, an alkylsulfonyl group and an arylsulfonyl group. Of them, a hydrogen atom, an aromatic group, a heterocyclic group, an alkylsulfonyl group or an arylsulfonyl group can be used, and particularly a hydrogen atom, an aryl group or a heterocyclic group can be used, with the proviso that $R_5$ and $R_6$ may not simultaneously take a hydrogen atom. Each of the substituents may further have a substituent.

In the general formula (I), $R_1$ and $R_2$ that may constitute parts of [D], [B] and [C], each independently represents a hydrogen atom or a substituent selected from the group described below. The group of the substituents includes a halogen atom, an aliphatic group, an aromatic group, a heterocyclic group, a cyano group, a carboxy group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group and a sulfonic acid group. A hydrogen atom of these substituents may be substituted.

[D] can be one selected from the group including the elements described below: a hydrogen atom, a halogen atom, an aliphatic group, an aromatic group, a hydroxyl group, an alkoxy group, an aryloxy group, an acyloxy group and a heterocyclic oxy group. Furthermore, an amino group, an acylamino group, an arylamino group, a ureido group, a sulfamoylamino group, an alkoxycarbonyl amino group, an aryloxycarbonylamino group, an alkylthio group, an arylthio group or a heterocyclic thio group can be used. Of them, a hydrogen atom, a halogen atom, an alkyl group, a hydroxyl group, an alkoxy group, an aryloxy group, an acyloxy group, an amino group or acylamino group can be used, and particularly a hydrogen atom, an arylamino group, an acylamino group can be used. These substituents may further have a substituent.

Furthermore, as $R_1$ and $R_2$, elements particularly described below can be used. A hydrogen atom, a halogen atom, an alkyl group, an alkoxycarbonyl group, a carboxy group, a carbamoyl group, a hydroxyl group, an alkoxy group and a cyano group can be used. These substituents may further have a substituent. $R_1$ and $R_5$ or $R_5$ and $R_6$ may be joined to form a 5-membered ring or a 6-membered ring.

In the general formula (I), when [A], $R_1$, $R_2$, $R_5$, $R_6$ and [D] further have a substituent, the substituent may be selected from those to be selected as $R_1$ and $R_2$ that can constitute parts of [D], [B] and [C] previously described.

When a compound of the general formula (I) is soluble in water, the compound further can have an ionic hydrophilic group on one selected from the group including the positions of [A], $R_1$, $R_2$, $R_5$, $R_6$ and [D] as a substituent. Specific examples of the ionic hydrophilic group serving as a substituent include a sulfonic acid group, a carboxy group, a phosphono group and a quaternary ammonium group. Of the ionic hydrophilic groups above, a carboxy group, a phosphono group or a sulfonic acid group can be used, and particularly a carboxy group or a sulfonic acid group can be used. The carboxy group, phosphono group and sulfonic acid group may be present in the form of a salt. Furthermore, as the counter ion forming a salt, alkali metal ions such as an ammonium ion, a lithium ion, a sodium ion and a potassium ion and organic cations such as a tetramethyl ammonium ion and a tetramethyl guanidinium ion may be mentioned.

Next, each of the substituents will be more specifically described below. In the present invention, the aliphatic group refers to an alkyl group, a substituted alkyl group, an alkenyl group, a substituted alkenyl group, an alkynyl group, a substituted alkynyl group, an aralkyl group and a substituted aralkyl group. The aliphatic group may have a branch or may have a ring. The number of carbon atoms of the aliphatic group can be 1 to 20, and further can be 1 to 16. The aryl moiety of the aralkyl group and substituted aralkyl group can be phenyl or naphthyl and particularly phenyl. Specific examples of the aliphatic group can include the following groups: a methyl group, an ethyl group, a butyl group, an isopropyl group, a t-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

In the present invention, the aromatic group refers to an aryl group and a substituted aryl group. The aryl group can be phenyl or naphthyl, and particularly phenyl. The number of carbon atoms of the aromatic group can be 6 to 20, and further can be 6 to 16. Specific examples of the aromatic group can include a phenyl group, a p-tolyl group, a p-methoxyphenyl group, an o-chlorophenyl group and a m-(3-sulfopropylamino)phenyl group.

As the heterocyclic group, a heterocyclic group having a substituent and an unsubstituted heterocyclic group may be mentioned. The heterocyclic ring may be joined with an aliphatic ring, an aromatic ring or other heterocyclic rings by condensation. As the heterocyclic group, heterocyclic groups of a 5-membered ring or a 6-membered ring can be mentioned. Specific examples of the substituent in this case include an aliphatic group, a halogen atom, an alkylsulfonyl group, an arylsulfonyl group, an acyl group, an acylamino group, a sulfamoyl group, a carbamoyl group and an ionic hydrophilic group. Furthermore, specific examples of the heterocyclic group can include a 2-pyridyl group, a 2-thienyl group, a 2-thiazolyl group, a 2-benzothiazolyl group, a 2-benzoxazolyl group and a 2-furyl group.

As the alkylsulfonyl group or arylsulfonyl group, an alkylsulfonyl group having a substituent or an arylsulfonyl group having a substituent and an unsubstituted alkylsulfonyl group or an unsubstituted arylsulfonyl group may be mentioned. Specific examples of the alkylsulfonyl group or arylsulfonyl group can include a methylsulfonyl group and a phenylsulfonyl group.

As the alkylsulfinyl group or arylsulfinyl group, an alkylsulfinyl group having a substituent or an arylsulfinyl group having a substituent, an unsubstituted alkylsulfinyl group or an unsubstituted arylsulfinyl group may be mentioned. Specific examples of the alkylsulfinyl group or arylsulfinyl group can include a methylsulfinyl group and a phenylsulfinyl group.

As the acyl group, an acyl group having a substituent and an unsubstituted acyl group may be mentioned. As the acyl group, an acyl group having 1 to 12 carbon atoms can be used. Specific examples of the substituent in this case can include an ionic hydrophilic group. Specific examples of the acyl group can include an acetyl group and a benzoyl group.

As the halogen atom, a fluorine atom, a chlorine atom and a bromine atom may be mentioned.

As the amino group, amino groups substituted with an alkyl group, an aryl group and/or a heterocyclic group may be mentioned. The alkyl group, aryl group and heterocyclic group may further have a substituent.

As the alkylamino group, an alkylamino group having 1 to 6 carbon atoms can be used. Specific examples of the substituent in this case can include an ionic hydrophilic group. Specific examples of the alkylamino group can include a methylamino group and a diethylamino group. As the arylamino group, an arylamino group having a substituent and an unsubstituted arylamino group may be mentioned. As the arylamino group, an arylamino group having 6 to 12 carbon atoms can be used. Specific examples of the substituent in this case can include a halogen atom and an ionic hydrophilic group. Specific examples of the arylamino group can include a phenylamino group and a 2-chlorophenylamino group.

As the alkoxy group, an alkoxy group having a substituent and an unsubstituted alkoxy group may be mentioned. As the alkoxy group, an alkoxy group having 1 to 12 carbon atoms can be used. Specific examples of the substituent in this case can include an alkoxy group, a hydroxyl group and an ionic hydrophilic group. Specific examples of the alkoxy group can include a methoxy group, an ethoxy group, an isopropoxy group, a methoxyethoxy group, a hydroxyethoxy group and a 3-carboxypropoxy group.

As the aryloxy group, an aryloxy group having a substituent and an unsubstituted aryloxy group may be mentioned. As the aryloxy group, an aryloxy group having 6 to 12 carbon atoms can be used. Specific examples of the substituent in this case can include an alkoxy group and an ionic hydrophilic group. Specific examples of the aryloxy group can include a phenoxy group, p-methoxyphenoxy group and an o-methoxyphenoxy group.

As the acylamino group, an acylamino group having a substituent and an unsubstituted acylamino group may be mentioned. As the acylamino group, an acylamino group having 2 to 12 carbon atoms can be used. Specific examples of the substituent in this case can include an ionic hydrophilic group. Specific examples of the acylamino group can include an acetylamino group, a propionylamino group, a benzoylamino group, an N-phenylacetylamino group and a 3,5-disulfobenzoylamino group.

As the ureido group, a ureido group having a substituent and an unsubstituted ureido group may be mentioned. As the ureido group, a ureido group having 1 to 12 carbon atoms can be used. Specific examples of the substituent in this case can include an alkyl group and an aryl group. Specific examples of the ureido group can include a 3-methylureido group, a 3,3-dimethylureido group and a 3-phenylureido group.

As the sulfamoylamino group, a sulfamoylamino group having a substituent and an unsubstituted sulfamoylamino group may be mentioned. Specific examples of the substituent in this case can include an alkyl group. Specific examples of the sulfamoylamino group can include N,N-dipropylsulfamoylamino.

As the alkoxycarbonylamino group, an alkoxycarbonylamino group having a substituent and an unsubstituted alkoxycarbonylamino group may be mentioned. As the alkoxycarbonylamino group, an alkoxycarbonylamino group having 2 to 12 carbon atoms can be used. Specific examples of the substituent in this case can include an ionic hydrophilic group. Specific examples of the alkoxycarbonylamino group can include an ethoxycarbonylamino group.

As the alkylsulfonylamino group and arylsulfonylamino group, the following groups may be mentioned which include an alkylsulfonylamino group having a substituent and an arylsulfonylamino group having a substituent, an unsubstituted alkylsulfonylamino group and an unsubstituted arylsulfonylamino group. As the sulfonylamino group, a sulfonylamino group having 1 to 12 carbon atoms can be used. Specific examples of the substituent in this case can include an ionic hydrophilic group. Specific examples of the alkylsulfonylamino group and arylsulfonylamino group can include a methylsulfonylamino group, an N-phenylmethylsulfonylamino group, a phenylsulfonylamino group and a 3-carboxyphenylsulfonylamino group.

As the carbamoyl group, a carbamoyl group having a substituent and an unsubstituted carbamoyl group may be mentioned. Specific examples of the substituent in this case can include an alkyl group. Specific examples of the carbamoyl group can include a methylcarbamoyl group and a dimethylcarbamoyl group.

As the sulfamoyl group, a sulfamoyl group having a substituent and an unsubstituted sulfamoyl group may be mentioned. Specific examples of the substituent in this case can include an alkyl group. Specific examples of the sulfamoyl group can include a dimethylsulfamoyl group and a di-(2-hydroxyethyl)sulfamoyl group.

As the alkoxycarbonyl group, an alkoxycarbonyl group having a substituent and an unsubstituted alkoxycarbonyl group may be mentioned. As the alkoxycarbonyl group, an alkoxycarbonyl group having 2 to 12 carbon atoms can be used. Specific examples of the substituent in this case can include an ionic hydrophilic group. Specific examples of the alkoxy carbonyl group can include a methoxycarbonyl group and an ethoxycarbonyl group.

As the acyloxy group, an acyloxy group having a substituent and an unsubstituted acyloxy group may be mentioned. As the acyloxy group, an acyloxy group having 1 to 12 carbon atoms can be used. Specific examples of the substituent in this case can include an ionic hydrophilic group. Specific examples of the acyloxy group can include an acetoxy group and a benzoyloxy group.

As the carbamoyloxy group, a carbamoyloxy group having a substituent and an unsubstituted carbamoyloxy group may be mentioned. Specific examples of the substituent in this case can include an alkyl group. Specific examples of the carbamoyloxy group can include an N-methylcarbamoyloxy group.

As the aryloxycarbonyl group, an aryloxycarbonyl group having a substituent and an unsubstituted aryloxycarbonyl group may be mentioned. As the aryloxycarbonyl group, an aryloxycarbonyl group having 7 to 12 carbon atoms can be used. Specific examples of the substituent in this case can include an ionic hydrophilic group. Specific examples of the aryloxycarbonyl group can include a phenoxycarbonyl group.

As the aryloxycarbonylamino group, an aryloxycarbonylamino group having a substituent and an unsubstituted aryloxycarbonylamino group may be mentioned. As the aryloxycarbonylamino group, an aryloxycarbonylamino group having 7 to 12 carbon atoms can be used. Specific examples of the substituent in this case can include an ionic hydrophilic group. Specific examples of the aryloxycarbonylamino group can include a phenoxycarbonylamino group.

As the alkylthio group, arylthio group and heterocyclic thio group, an alkylthio group, arylthio group and heterocyclic thio group having a substituent and an unsubstituted alkylthio group, arylthio group and heterocyclic thio group may be mentioned. As the alkylthio group, arylthio group and heterocyclic thio group, those having 1 to 12 carbon atoms can be used. Specific examples of the substituent in this case can include an ionic hydrophilic group. Specific examples of the alkylthio group, arylthio group and heterocyclic thio group can include a methylthio group, a phenylthio group and a 2-pyridylthio group.

As the silyloxy group, a silyloxy group substituted with an aliphatic group or aromatic group having 1 to 12 carbon atoms can be used. Specific examples of the silyloxy group can include a trimethylsilyloxy group and a diphenylmethylsilyloxy group.

As the heterocyclic oxy group, a heterocyclic oxy group having a substituent and an unsubstituted heterocyclic oxy group may be mentioned. As the heterocyclic oxy group, a heterocyclic oxy group having 2 to 12 carbon atoms can be used. Specific examples of the substituent in this case can include an alkyl group, an alkoxy group, and an ionic hydroxyl group. Specific examples of the heterocyclic oxy group can include a 3-pyridyloxy group and a 3-thienyloxy group.

As the alkoxycarbonyloxy group, an alkoxycarbonyloxy group having a substituent and an unsubstituted alkoxycarbonyloxy group may be mentioned. As the alkoxycarbonyloxy group, an alkoxycarbonyl group having 2 to 12 carbon atoms can be used. Specific examples of the alkoxycarbonyloxy group can include a methoxycarbonyloxy group and an isopropoxycarbonyloxy group.

As the aryloxycarbonyloxy group, an aryloxycarbonyloxy group having a substituent and an unsubstituted aryloxycarbonyloxy group may be mentioned. As the aryloxycarbonyloxy group, an aryloxycarbonyloxy group having to 7 to 12 carbon atoms can be used. Specific examples of the aryloxycarbonyloxy group can include a phenoxycarbonyloxy group.

As the heterocyclic oxycarbonyl group, a heterocyclic oxycarbonyl group having a substituent and an unsubstituted heterocyclic oxycarbonyl group may be mentioned. As the heterocyclic oxycarbonyl group, a heterocyclic oxycarbonyl group having 2 to 12 carbon atoms can be used. Specific examples of the substituent in this case can include an ionic hydrophilic group. Specific examples of the heterocyclic oxycarbonyl group can include a 2-pyridyloxycarbonyl group.

As the heterocyclic sulfonylamino group, a heterocyclic sulfonylamino group having a substituent and an unsubstituted heterocyclic sulfonylamino group may be mentioned. As the heterocyclic sulfonylamino group, a heterocyclic sulfonylamino group having 1 to 12 carbon atoms can be used.

Specific examples of the substituent in this case can include an ionic hydrophilic group. Specific examples of the heterocyclic sulfonylamino group can include a 2-thiophenesulfonylamino group and a 3-pyridinesulfonylamino group.

As the heterocyclic sulfonyl group, a heterocyclic sulfonyl group having a substituent and an unsubstituted heterocyclic sulfonyl group may be mentioned. As the heterocyclic sulfonyl group, a heterocyclic sulfonyl group having 1 to 12 carbon atoms can be used. Specific examples of the substituent in this case can include an ionic hydrophilic group. Specific examples of the heterocyclic sulfonyl group can include a 2-thiophenesulfonyl group and a 3-pyridinesulfonyl group.

As the heterocyclic sulfinyl group, a heterocyclic sulfinyl group having a substituent and an unsubstituted heterocyclic sulfinyl group may be mentioned. As the heterocyclic sulfinyl group, a heterocyclic sulfinyl group having 1 to 12 carbon atoms can be used. Specific examples of the heterocyclic sulfinyl group can include a 4-pyridinesulfinyl group.

In the present invention, a compound of the general formula (I) can be a compound represented by the following general formula (I-2) (hereinafter, sometimes referred to as a "compound of the general formula (I-2)).

General formula (I-2)

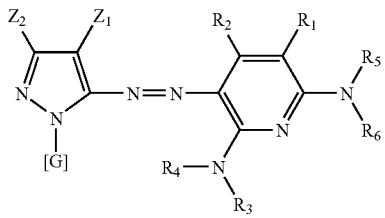

wherein, $Z_1$ is an electron withdrawing group having a Hammett σp value of 0.20 or more; $Z_2$ is a hydrogen atom, an aliphatic group, an aromatic group or a heterocyclic group; $R_1$, and $R_2$ are each independently a hydrogen atom or a substituent selected from the group described below. The group of substituents includes a halogen atom, an aliphatic group, an aromatic group, a heterocyclic group, a cyano group, a carboxy group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, an silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group and a sulfonic acid group. A hydrogen atom of these substituents may be substituted. $R_3$ and $R_4$ are each independently one selected from the group including a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group and a sulfamoyl group. $R_5$ and $R_6$ are each independently a hydrogen atom or a substituent selected from the group described below. The group of substituents includes an aliphatic group, an aromatic group, a heterocyclic group, an acyl group, an alkoxycarbonyl group, an aryloxycarbonyl group, a carbamoyl group, an alkylsulfonyl group, an arylsulfonyl group and a sulfamoyl group. A hydrogen atom of these substituents may be substituted. [G] of the formula is one selected from the group including a hydrogen atom, an aliphatic group, an aromatic group and a heterocyclic group.

In the general formula (I-2), $Z_1$ is an electron withdrawing group having a Hammett σp value of 0.20 or more. $Z_1$ is an electron withdrawing group having a Hammett σp value of 0.20 or more; however, in the present invention, a Hammett σp value can be 0.30 or more, further can be 0.45 or more, and particularly can be 0.60 or more. On the other hand, a Hammett σp value can be below 1.0.

Regarding $Z_1$ herein, Hammett rule and a Hammett substituent constant σp value (hereinafter, referred to as "Hammett σp value") will be described. The Hammett rule is an empirical rule proposed by L. P. Hammett in 1935 to quantitatively discuss the effect of a substituent on the reaction and equilibrium of a benzene derivative and nowadays validity thereof is widely recognized. The substituent constants obtained by the Hammett rule are σp value and σm value, which are described in many general publications. Detailed descriptions are found in, for example, Lange s Handbook of Chemistry, the 12th edition, edited by J. A. Dean, 1979, McGraw-Hill and Region of Chemistry, extra number, 122, page 96 to 103, 1979, Nankodo.

Note that, in the present invention, a substituent $Z_1$ of the general formula (I-2) is defined on the basis of Hammett σp value; however, the present invention is not limited only to the substituent whose σp value is specifically described in the aforementioned publications. Needless to say, a substituent whose σp value is not specifically described in the aforementioned publications but will be within the range if calculated on the basis of the Hammett rule, is included in the present invention. Compounds of the general formula (I) and compounds of the general formula (I-2) include a compound other than benzene derivatives; however, in the present invention, a σp value is used as a standard indicating the effect of electrons of a substituent irrelevant to the substitution position. Specific examples of the substituents that can be used as an electron withdrawing group having a Hammett σp value of 0.20 or more of the compounds of the general formula (I) or the compounds of the general formula (I-2) will be described below, separately by the range of Hammett σp value.

Electron withdrawing groups having a Hammett σp value of 0.60 or more are as follows: a cyano group, a nitro group, an alkylsulfonyl group (e.g., a methanesulfonyl group) and an arylsulfonyl group (e.g., a benzenesulfonyl group).

Electron withdrawing groups having a Hammett σp value of 0.45 or more include the following groups in addition to the aforementioned ones: an acyl group (e.g., an acetyl group), an alkoxycarbonyl group (e.g., a dodecyloxycarbonyl group), an aryloxycarbonyl group (e.g., a m-chlorophenoxycarbonyl group), an alkylsulfinyl group (e.g., a n-propylsulfinyl group), an arylsulfinyl group (e.g., a phenylsulfinyl group), a sulfamoyl group (e.g., an N-ethylsulfamoyl group, an N,N-dimethylsulfamoyl group) and a halogenated alkyl group (e.g., a trifluoromethyl group).

Electron withdrawing groups having a Hammett σp value of 0.30 or more include the following groups in addition to the aforementioned ones: an acyloxy group (e.g., an acetoxy group), a carbamoyl group (e.g., an N-ethylcarbamoyl group and an N,N-dibutylcarbamoyl group), a halogenated alkoxy group (e.g., a trifluoromethyloxy group), a halogenated aryloxy group (e.g., a pentafluorophenyloxy group), a sulfonyloxy group (e.g., a methylsulfonyloxy group), a halogenated alkylthio group (e.g., a difluoromethylthio group), an aryl group substituted by 2 or more electron withdrawing groups having a σp value of 0.15 or more (e.g., a 2,4-dinitrophenyl group and a pentachlorophenyl group) and a heterocyclic group (e.g., a 2-benzoxazolyl group, a 2-benzothiazolyl group and a 1-phenyl-2-benzimidazolyl group).

Electron withdrawing groups having a Hammett σp value of 0.20 or more include the following groups in addition to the aforementioned ones: a halogen atom (e.g., fluorine, chlorine, bromine).

In the compound to be used in the present invention, $Z_1$ of the general formula (I-2) can be any one of the groups described below: an acyl group having 2 to 12 carbon atoms, an alkyloxycarbonyl group having 2 to 12 carbon atoms, a nitro group, a cyano group, an alkylsulfonyl group having 1 to 12 carbon atoms, an arylsulfonyl group having 6 to 18 carbon atoms, a carbamoyl group having 1 to 12 carbon atoms, or a halogenated alkyl group having 1 to 12 carbon atoms. Furthermore, a cyano group, an alkylsulfonyl group having 1 to 12 carbon atoms, or an arylsulfonyl group having 6 to 18 carbon atoms can be further used, and particularly a cyano group can be used.

In the general formula (I-2) previously described, $R_1$, $R_2$, $R_5$ and $R_6$ are the same as defined in the general formula (I). In the general formula (I-2), $R_3$ and $R_4$ are each independently selected from the group below: any one of a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group and a sulfamoyl group. Of them, a hydrogen atom, an aromatic group, a heterocyclic group, an acyl group, an alkylsulfonyl group or an arylsulfonyl group can be used, and further a hydrogen atom, an aromatic group or a heterocyclic group can be used. Furthermore, in the general formula (I-2), $Z_2$ is one selected from the group including a hydrogen atom, an aliphatic group, an aromatic group and a heterocyclic group.

In the general formula (I-2) previously described, [G] is one selected from the group including a hydrogen atom, an aliphatic group, an aromatic group and a heterocyclic group. Of them, a group having non-metal atoms required for forming a 5-membered ring to a 8-membered ring can be used. These 5-membered ring to 8-membered ring may be substituted or a saturated ring, or may have an unsaturated bond. Of them, particularly, an aromatic group or a heterocyclic group can be used. As the non-metal atoms, a nitrogen atom, an oxygen atom, a sulfur atom and a carbon atom may be mentioned. Specific examples of the ring structure include the following rings: a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benzimidazole ring, an oxazole ring, a benzoxazole ring, a thiazole ring, a benzothiazole ring, an oxane ring, a sulfolane ring and a thiane ring.

Each of the substituents constituting a compound of the general formula (I-2) may further have a substituent. As the substituent in the case where each of the substituents further has a substituent, the substituents exemplified in the general formula (I), the substituents exemplified as [D] or $R_1$ and $R_2$ constituting the general formula (I) and an ionic hydrophilic group may be mentioned.

Next, in the present invention, a particularly desirable structure of a compound of the general formula (I) previously described will be described below. First, $R_5$ and $R_6$ of a compound of the general formula (I) can be independently selected from the group including the following groups. More specifically, $R_5$ and $R_6$ can be independently selected from the group including a hydrogen atom, an alkyl group, an aryl group, a heterocyclic group, a sulfonyl group, and an acyl group.

Furthermore, $R_5$ and $R_6$ can be independently selected from the group including a hydrogen atom, an aryl group, a heterocyclic group, and a sulfonyl group. Particularly, $R_5$ and $R_6$ can be independently selected from the group including a hydrogen atom, an aryl group, and a heterocyclic group. However, $R_5$ and $R_6$ may not simultaneously be a hydrogen atom.

Furthermore, in the present invention, [D] of a compound of the general formula (I) can be any one of the following groups. Specifically, a hydrogen atom, a halogen atom, an aliphatic group, an aromatic group, a hydroxyl group, an alkoxy group, an aryloxy group, an acyloxy group, a heterocyclic oxy group, an amino group, an acylamino group, an arylamino group, a ureido group, a sulfamoylamino group, an alkoxycarbonyl amino group, an aryloxycarbonylamino group, an alkylthio group, an arylthio group or a heterocyclic thio group can be mentioned. Furthermore, a hydrogen atom, a halogen atom, an alkyl group, a hydroxyl group, an alkoxy group, an aryloxy group, an acyloxy group, an amino group or an acylamino group can be mentioned. Particularly, a hydrogen atom, an arylamino group or an acylamino group can be mentioned. These substituents may further have a substituent.

Furthermore, in the present invention, [A] of a compound of the general formula (I) can be any one of the following groups. Specifically, a pyrazole ring, an imidazole ring, an isothiazole ring, a thiadiazole ring or a benzothiazole ring can be mentioned. Furthermore, a pyrazole ring or an isothiazole ring can be mentioned. Particularly, a pyrazole ring can be mentioned.

Furthermore, in the present invention, [B] and [C] of a compound of the general formula (I) can be $CR_1$ and $CR_2$, respectively. Furthermore, $R_1$ and $R_2$ can be each independently a hydrogen atom, a halogen atom, a cyano group, a carbamoyl group, a carboxy group, an alkyl group, a hydroxyl group, an alkoxy group or an alkoxycarbonyl group, and particularly, a hydrogen atom, an alkyl group, a carboxy group, a cyano group or a carbamoyl group.

Note that, in the desirable combination of substituents constituting a compound of the general formula (I) that can be used, at least one of the substituents can be a group as mentioned above. A larger number of substituents can be groups as mentioned above. Particularly, all substituents can be groups as mentioned above.

As a specific example of a compound of the general formula (I) or a compound of the general formula (I-2), the following compounds I-1 to I-44 exemplified below may be mentioned. As a matter of course, the present invention is not limited to the compounds thus exemplified. Any compound may be used as long as the structure and definition of the compound fall within the range of those of the general formula (I) or the general formula (I-2).

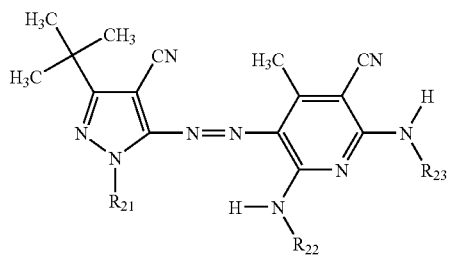
| Dye | R$_{21}$ |
|---|---|
| I-1 | 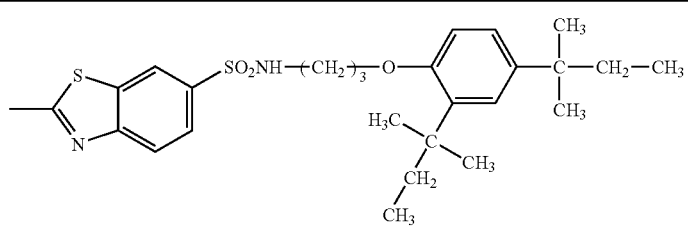 |
| I-2 | 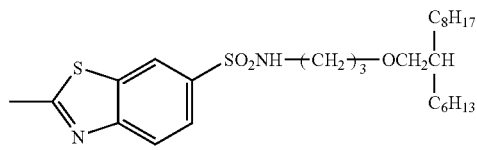 |
| I-3 | 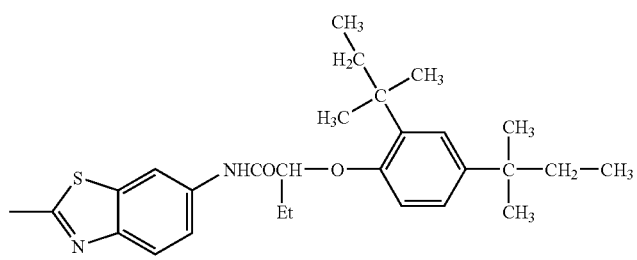 |
| I-4 | 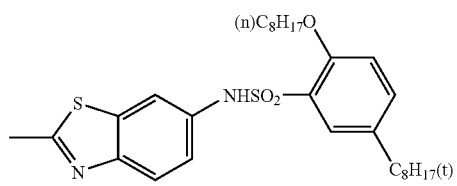 |
| I-5 | 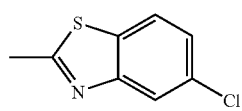 |
| Dye | R$_{22}$ | R$_{23}$ |
|---|---|---|
| I-1 | |  |
| I-2 | | 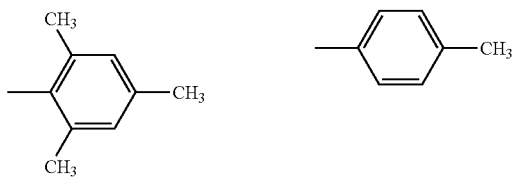 |

-continued
| | | |
|---|---|---|
| I-3 |  | |
| I-4 | 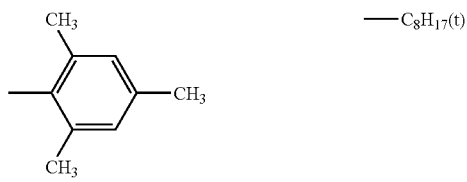 | —C$_8$H$_{17}$(t) |
| I-5 |  | |
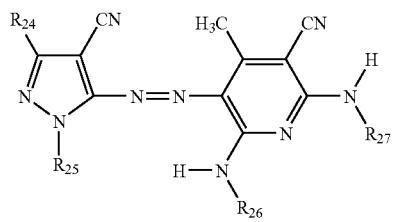
| Dye | R$_{24}$ | R$_{25}$ | R$_{26}$ | R$_{27}$ |
|---|---|---|---|---|
| I-6 | 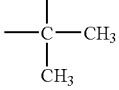 | 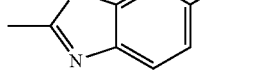 | 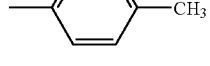 | 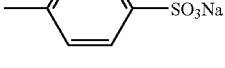 |
| I-7 | 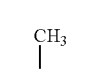 | 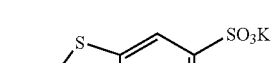 |  |  |
| I-8 | 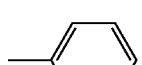 | 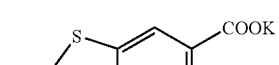 | 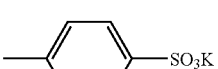 |  |
| I-9 | 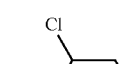 | 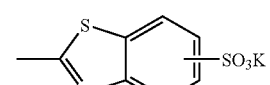 (4.5-mix) | 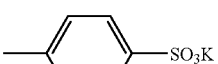 | 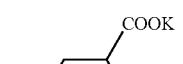 |
| I-10 | 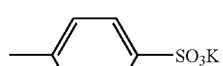 | 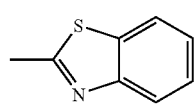 | 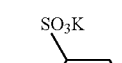 | 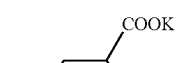 |

| Dye | R28 |
|---|---|
| I-11 | 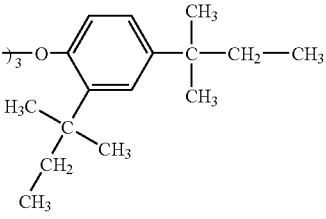 |
| I-12 | 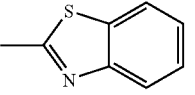 |
| I-13 | 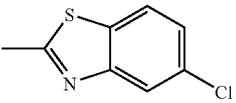 |
| I-14 | 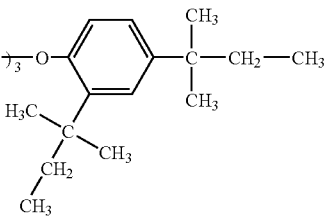 |
| I-15 | 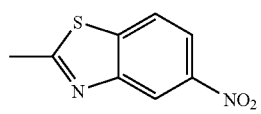 |
| Dye | R29 |
|---|---|
| I-11 | 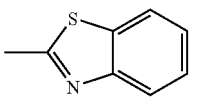 |
| I-12 | 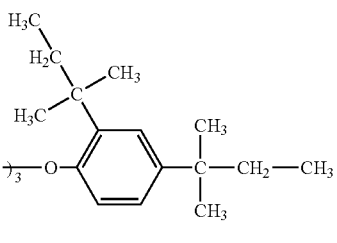 |

-continued
| Dye | | |
|---|---|---|
| I-13 | 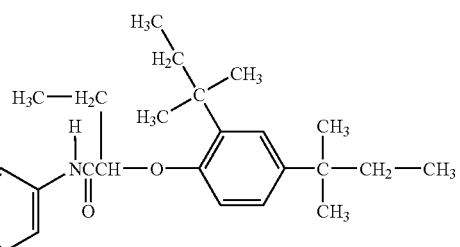 | |
| I-14 | 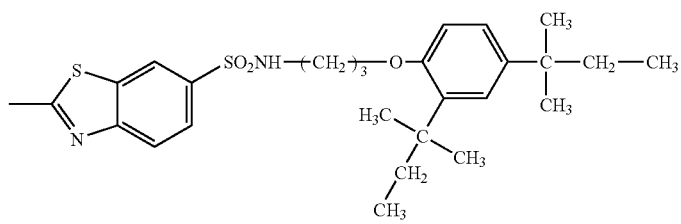 | |
| I-15 | 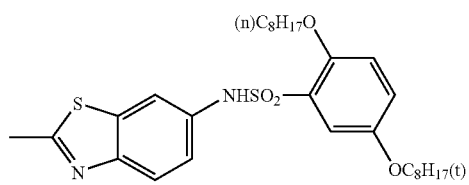 | |
| Dye | R₃₀ | R₃₁ |
|---|---|---|
| I-11 | 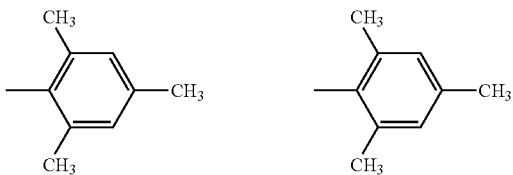 | |
| I-12 | 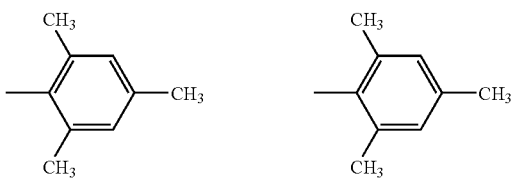 | |
| I-13 | 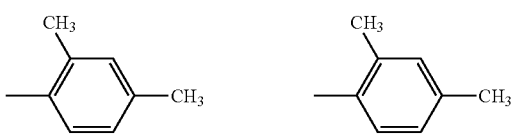 | |
| I-14 | 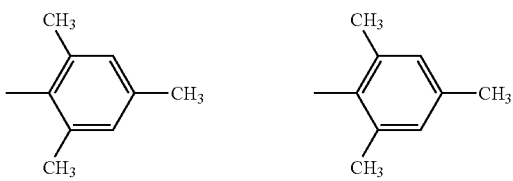 | |
| I-15 | 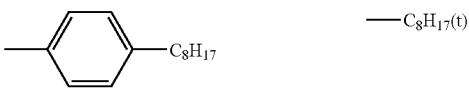 | —C₈H₁₇(t) |

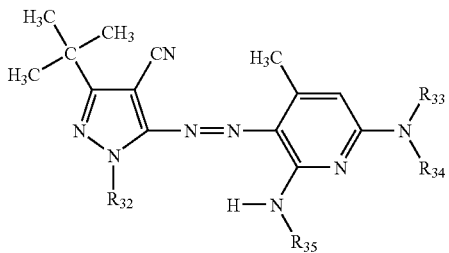
| Dye | $R_{32}$ | $R_{33}$ |
|---|---|---|
| I-16 | 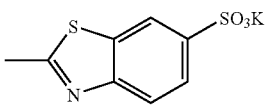 | 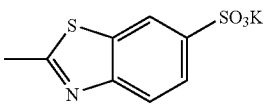 |
| I-17 | 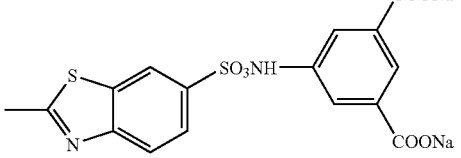 | 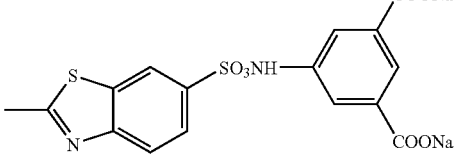 |
| I-18 | 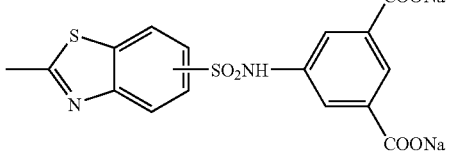 (5.6-mix) | 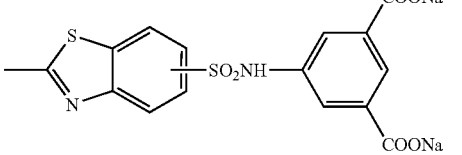 (5.6-mix) |
| I-19 | 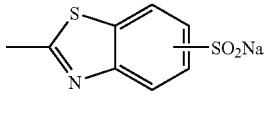 | 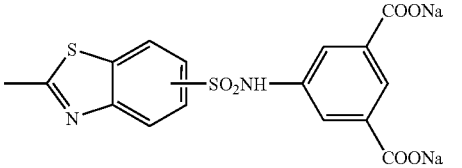 (5.6-mix) |
| Dye | $R_{34}$ | $R_{35}$ |
|---|---|---|
| I-16 | 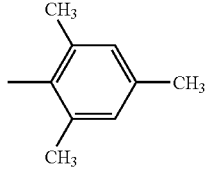 | 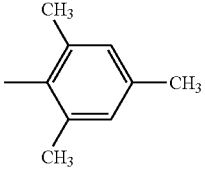 |
| I-17 | 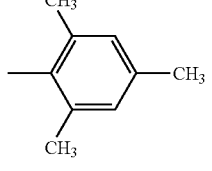 | 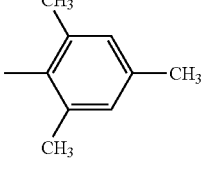 |
| I-18 | 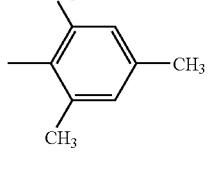 | 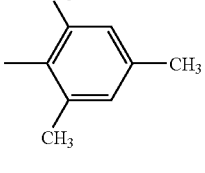 |

-continued
I-19 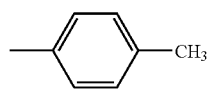 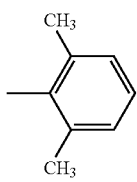
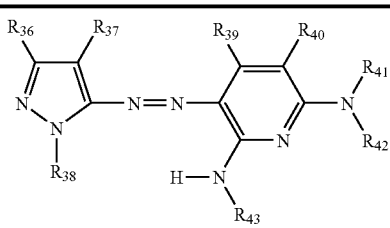
| Dye | $R_{36}$ | $R_{37}$ | $R_{38}$ |
|---|---|---|---|
| I-20 | 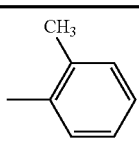 | —CN | 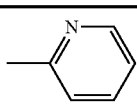 |
| I-21 | 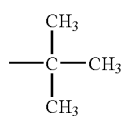 | —Br | 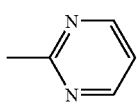 |
| I-22 | 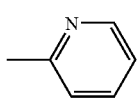 | —SO$_2$CH$_3$ | 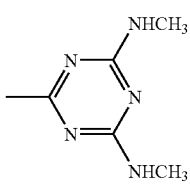 |
| I-23 | 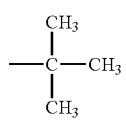 | —CN | 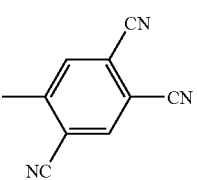 |
| I-24 | 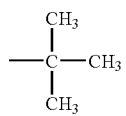 | —Br | 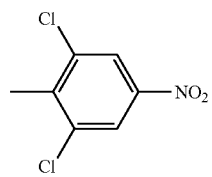 |
| I-25 | 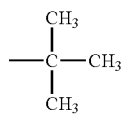 | —CN | 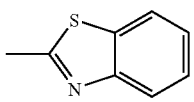 |
| I-26 | 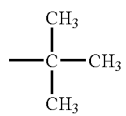 | —CN | 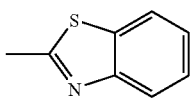 |

-continued

| Dye | R₃₉ | R₄₀ | R₄₁ | R₄₂ | R₄₃ |
|---|---|---|---|---|---|
| I-20 | —H | —CONH₂ | —SO₂CH₃ | 2-methyl-octyloxyphenyl | 2-methylphenyl |
| I-21 | —COOEt | —H | 2-methylbenzothiazol-2-yl | —C₈H₁₇(t) | —COCH₃ |
| I-22 | —CONH₂ | —H | 6-chloro-2-methylbenzothiazol-2-yl | 4-methylphenyl | —CO—C(CH₃)₃ |
| I-23 | —H | —H | 5-chloro-2-methylbenzothiazol-2-yl | 2-methylphenyl | —SO₂CH₃ |
| I-24 | —H | —CONH₂ | —C(O)CH₃ | 2,3,5-trimethylphenyl | 4-octylphenyl |
| I-25 | —CH₃ | —H | 2-methylbenzothiazol-2-yl | 2,6-diethyl-4-methylphenyl | 2,6-diethyl-4-methylphenyl |
| I-26 | —CH₃ | —CN | —H | 2,6-diethyl-4-methylphenyl | 2,6-diethyl-4-methylphenyl |

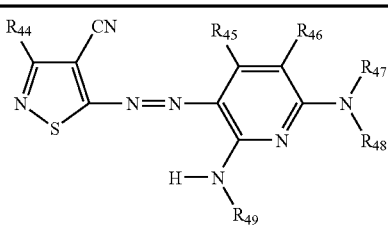

| Dye | R₄₄ | R₄₅ | R₄₆ | R₄₇ | R₄₈ | R₄₉ |
|---|---|---|---|---|---|---|
| I-27 | —CH₃ | —CH₃ | —CN | —H | 4-octylphenyl | 4-octylphenyl |

-continued

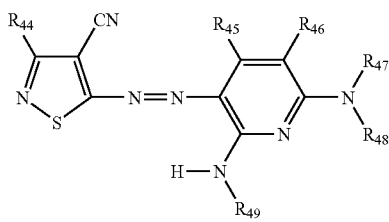

| Dye | $R_{44}$ | $R_{45}$ | $R_{46}$ | $R_{47}$ | $R_{48}$ | $R_{49}$ |
|---|---|---|---|---|---|---|
| I-28 | —CH$_3$ | —CH$_3$ | —CN | —H | 2,4,5-trimethylphenyl | 2,4,5-trimethylphenyl |
| I-29 | —CH$_3$ | —CH$_3$ | —CONH$_2$ | —H | 4-C$_8$H$_{17}$-phenyl | 2,4,5-trimethylphenyl |
| I-30 | —CH$_3$ | —CH$_3$ | —H | —H | 2,4,5-trimethylphenyl | 2,4,5-trimethylphenyl |
| I-31 | —CH$_3$ | —H | —CN | —H | 3-methyl-4-SO$_3$Na-phenyl | 3-methyl-4-SO$_3$Na-phenyl |
| I-32 | —CH$_3$ | —CH$_3$ | —H | 2-benzothiazolyl | 2,4,5-trimethylphenyl | 2,4,5-trimethylphenyl |
| I-33 | —CH$_3$ | —CH$_3$ | —H | 2-benzothiazolyl | 2,4,5-trimethylphenyl | 4-C$_8$H$_{17}$-phenyl |
| I-34 | —CH$_3$ | —H | —H | —SO$_2$CH$_3$ | 3-methyl-4-SO$_3$Na-phenyl | 3-methyl-4-SO$_3$Na-phenyl |

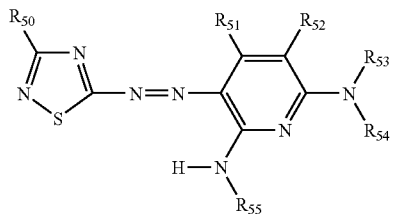
| Dye | $R_{50}$ | $R_{51}$ | $R_{52}$ |
|---|---|---|---|
| I-35 | —SCH$_3$ | —CH$_3$ | —CN |
| I-36 | 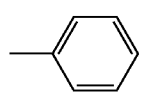 | —H | —CONH$_2$ |
| I-37 | 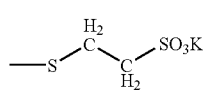 | —CH$_3$ | —H |
| I-38 | —CH$_3$ | —CH$_3$ | —H |
| I-39 | 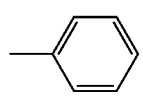 | —H | —H |
| Dye | $R_{53}$ | $R_{54}$ | $R_{55}$ |
|---|---|---|---|
| I-35 | —H | —C$_8$H$_{17}$(t) | 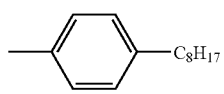 |
| I-36 | —H | 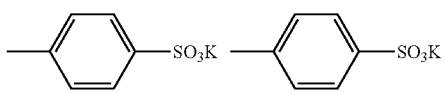 | 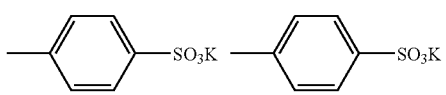 |
| I-37 | 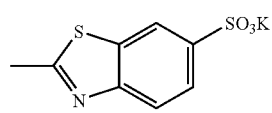 | 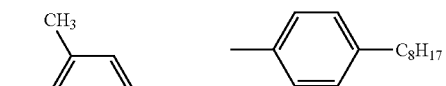 | |
| I-38 | 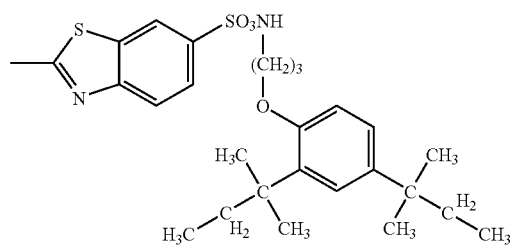 | 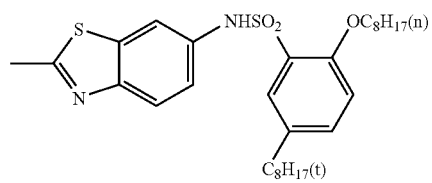 | 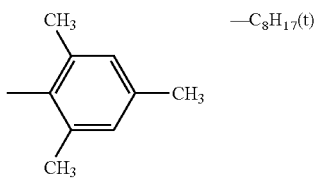 |
| I-39 | | | —C$_8$H$_{17}$(t) |

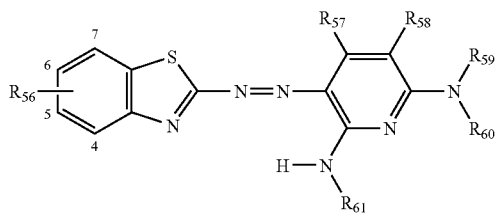
| Dye | $R_{56}$ | $R_{57}$ | $R_{58}$ |
|---|---|---|---|
| I-40 | 5-Cl | —CH$_3$ | —CONH$_2$ |
| I-41 | 5,6-diCl | —H | —H |
| I-42 | 5,6-diCl | —CH$_3$ | —H |
| I-43 | 5-CH$_3$ | —H | —CN |
| I-44 | 5-NO$_2$ | —CH$_3$ | —H |
| Dye | $R_{59}$ | $R_{60}$ | $R_{61}$ |
|---|---|---|---|
| I-40 | —H | —C$_8$H$_{17}$(t) | —C$_8$H$_{17}$(t) |
I-41 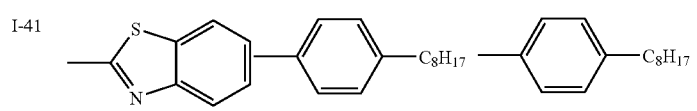
I-42 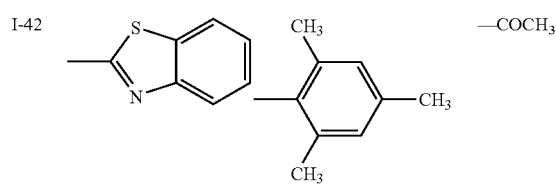 —COCH$_3$
I-43 —H 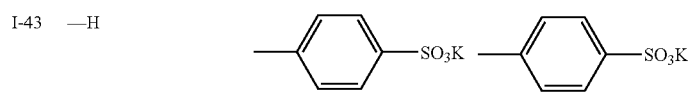
I-44 —SO$_2$CH$_3$ 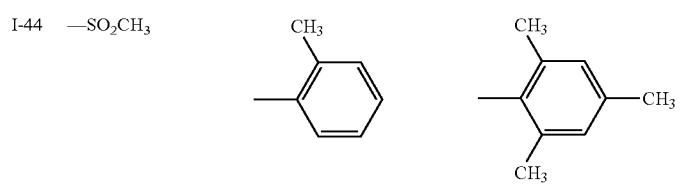

In the present invention, a compound of the general formula (I) can be particularly a compound represented by the following general formula (I-3) (hereinafter, sometimes referred to as a "compound of the general formula (I-3)").

General Formula (I-3)

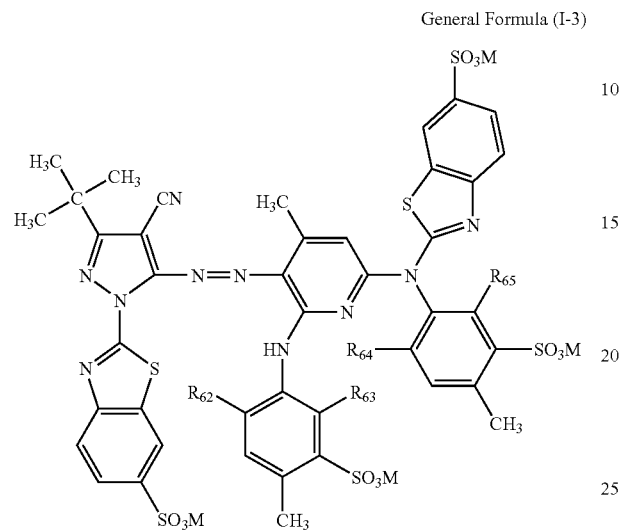

wherein, $R_{62}$, $R_{63}$, $R_{64}$ and $R_{65}$ are each independently an alkyl group; M(s) are each independently one selected from the group including a hydrogen atom, an alkali metal, ammonium and organic ammonium.

In the general formula (I-3), $R_{62}$, $R_{63}$, $R_{64}$ and $R_{65}$ are each independently an alkyl group. The alkyl group can have 1 to 3 carbon atoms in view of solubility to an aqueous medium constituting ink. Specifically, a methyl group, an ethyl group, a primary propyl group and a secondary propyl group may be mentioned. Note that if the alkyl group has 4 or more carbon atoms, a coloring material has large hydrophobicity and thus may not be always dissolved in an aqueous medium constituting ink.

In the general formula (I-3), M(s) are each independently one selected from the group including an alkali metal, ammonium and organic ammonium. As the alkali metal, for example, lithium, sodium and potassium may be mentioned. As the organic ammonium, for example, acetamide, benzamide, methylamino, butylamino, diethylamino, phenylamino and triethanolamino may be mentioned.

As specific examples of a compound of the general formula (I-3), the compounds I-45 to I-47. exemplified below can be mentioned. Note that the compounds exemplified below will be expressed in the form of free acid. As a matter of course, the present invention is not limited to the following compounds exemplified below. Any compound may be used as long as the structure and definition of the compound fall within those of the general formula (I-3). Of the compounds exemplified below, the compound I-46 can be particularly used herein.

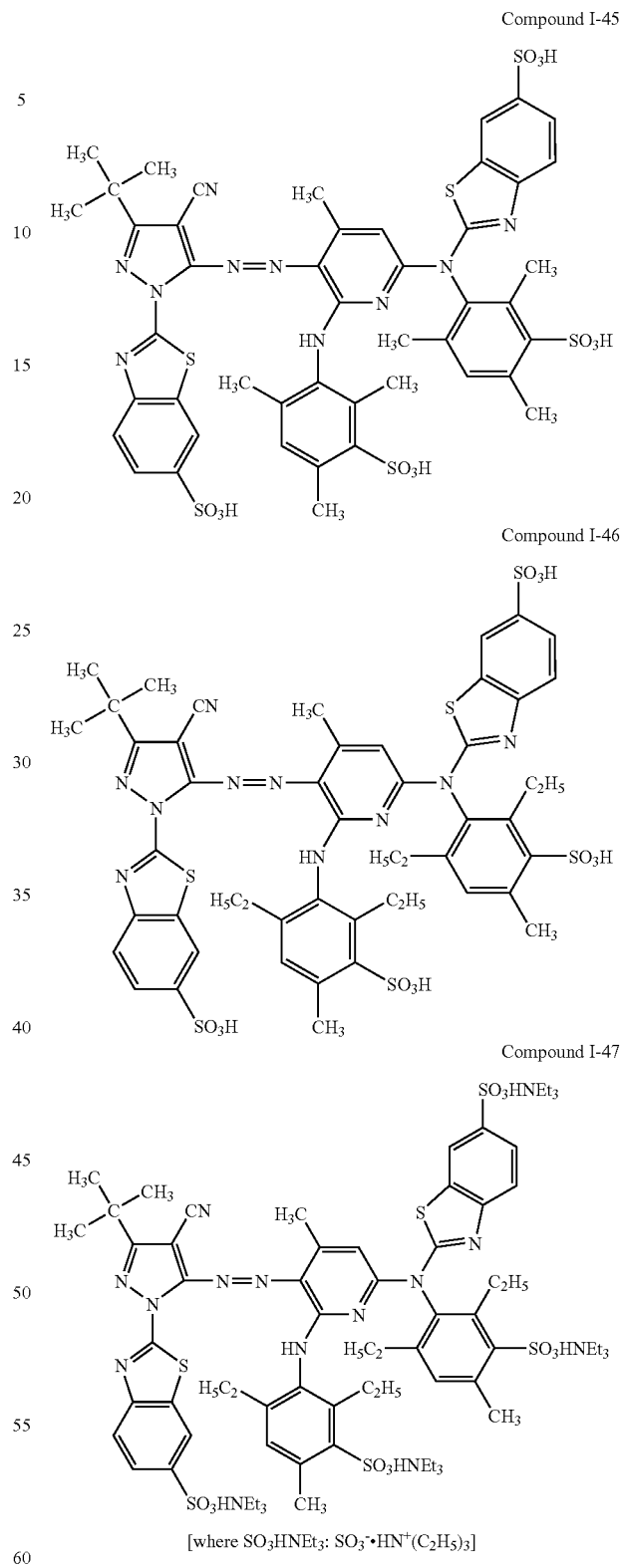

[where $SO_3HNEt_3$: $SO_3^- \cdot HN^+(C_2H_5)_3$]

(Compound Represented by the General Formula (II))

As described above, the present inventors conducted various studies on formulation of ink in order to further improve the lightfastness of an image recorded by ink containing a compound of the general formula (I) above. To be more specifically, studies have been made to improve the fastness properties of an image recorded by ink containing a compound of the general formula (I) by using compounds, which are conventionally known to improve the fastness properties of an image. However, it was found that use of such a compound in combination with a compound of the general formula (I) raises another problem such as deterioration of sticking resistance of ink and insufficient intermittent ejection stability.

Then, the present inventors studied on a wide variety of materials including various types of water-soluble organic solvents and compounds as a compound to be used in combination with a compound of the general formula (I) above. As a result, they found that addition of a compound of the following general formula (II) to the ink containing a compound of the general formula (I) above can drastically improve the lightfastness of an image recorded by the ink. Furthermore, use of a compound of the following general formula (II) improves the sticking resistance of ink and intermittent ejection stability, and maintains reliability of ink and the lightfastness of an image simultaneously at high levels.

$$R_x\text{-}[E]\text{-}R_y \qquad \text{General formula (II)}$$

wherein, in general formula (II), -[E]- is —S—, —S(=O)— or —S(=O)$_2$—; $R_x$ and $R_y$ are each independently one selected from the group including a hydrogen atom, a hydroxyl group, an alkyl group, a hydroxyalkyl group, an alkenyl group, an acyl group, a carbamoyl group, a carboxy group and a sulfonyl group, with the proviso that $R_x$ and $R_y$ may not simultaneously take hydrogen atoms or hydroxyl groups or an hydrogen atom and a hydroxyl group.

In the general formula (II), $R_x$ and $R_y$ are each independently one selected from the group including a hydrogen atom, a hydroxyl group, an alkyl group, a hydroxyalkyl group, an alkenyl group, an acyl group, a carbamoyl group, a carboxy group and a sulfonyl group. As the alkyl group, an alkyl group having 1 to 4 carbon atoms can be used. More specifically, for example, a methyl group, an ethyl group, a n-propyl group, an iso-propyl group, a n-butyl group, a sec-butyl group, a t-butyl group and an iso-butyl group may be mentioned. As the hydroxyalkyl group, for example, a hydroxymethyl group, a hydroxyethyl group, a hydroxypropyl group and a hydroxybutyl group may be mentioned. As the acyl group, for example, an acetyl group and a benzoyl group may be mentioned. As the carbamoyl group, for example, a methylcarbamoyl group and a dimethylcarbamoyl group may be mentioned.

In the present invention, in the general formula (II) above, there is a description reading "$R_x$ and $R_y$ may not simultaneously take hydrogen atoms or hydroxyl groups or an hydrogen atom and a hydroxyl group". This phrase means that, in the general formula (II), a case where $R_x$ and $R_y$ simultaneously take a hydrogen atom, a case where $R_x$ and $R_y$ simultaneously take a hydroxyl group and a case where one of $R_x$ and $R_y$ is a hydrogen atom and the other one is a hydroxyl group are not included.

The mechanism of improving the lightfastness of an image recorded by the ink containing a compound of the general formula (I) and a compound of the general formula (II) is not specifically elucidated; however, the present inventors predict the reason as follows. A compound of the general formula (I) has a strong electron withdrawing group. Therefore, on the recording medium to which ink is applied, a polar group of a compound of the general formula (II), specifically, a substituent for a sulfur atom, is selectively adsorbed onto a compound of the general formula (I) at a site having a low electron density, thereby protecting the compound of the general formula (I). As a result, decomposition of the compound of the general formula (I) by light, i.e., UV energy, is suppressed and the lightfastness of the image conceivably improves.

Examples of a compound of the general formula (II) above that can be used include sulfine, sulfinic acid, dimethylsulfine, dimethylsulfoxide, dimethylsulfone, (2-hydroxyethyl)methylsulfone, thiodiglycol, bis(2-hydroxyethyl)sulfoxide, 1-(2-hydroxyethylthio)-2-propanol and bis(2-hydroxyethyl)sulfone. Note that the present invention is not limited to the compounds described above. Any compound may be used as long as the structure of the compound is included in the structure of the general formula (II). Of the compounds exemplified above, particularly, bis(2-hydroxyethyl)sulfone can be used herein.

The content (% by mass) of a compound of the general formula (II) in ink can be 1.0% by mass or more to 30.0% by mass or less with respect to the total mass of the ink. If the content of a compound of the general formula (II) is less than 1.0% by mass, the effect of improving the lightfastness of an image may not sometimes be sufficiently obtained. On the other hand, if the content of a compound of the general formula (II) exceeds 30.0% by mass, intermittent ejection stability may not be sufficiently obtained.

(Glycerin)

The present inventors further conducted studies in order to simultaneously attain the lightfastness of an image recorded by the ink containing a compound of the general formula (I) above and the reliability of the ink at higher levels. As a result, they found that use of glycerin as a compound to be used in combination with the compound of the general formula (I) in addition to a compound of the general formula (II) can attain these performances at higher levels and further improves recovery from the state of sticking. To describe more specifically, when glycerin is used in combination, it is desirable that the content of glycerin (% by mass) in ink is set at 1.0% by mass or more to 20.0% by mass or less with respect to the total mass of the ink. If the content of glycerin is less than 1.0% by mass, the effect of improving sticking resistance may not be always sufficiently obtained. On the other hand, if the content of glycerin exceeds 20.0% by mass, the effect of improving intermittent ejection stability may not be always sufficiently obtained.

Furthermore, the present inventors found that when a compound of the general formula (II) and glycerin were used in combination with a compound of the general formula (I), the sum of the contents of the compound of the general formula (II) and glycerin can fall within the range below. To be more specific, if the content is prepared as described below, the lightfastness of an image and sticking resistance of ink can be simultaneously obtained at high levels. In addition, intermittent ejection stability can be improved. More specifically, it is desirable that the sum of the content of the compound of the general formula (II) (% by mass) and the content of glycerin (% by mass) is 8.0% by mass or more to 23.0% by mass or less with respect to the total mass of the ink. On the contrary, if the sum of the contents of the compounds does not fall within the aforementioned range, the effect of improving intermittent ejection stability may not be always sufficiently obtained.

Furthermore, the present inventors found that an additional effect can be obtained by controlling the mass ratio of the content of a compound of the general formula (II) and the content of glycerin in ink to fall within a predetermined range. That is, if the control is made in this way, sticking resistance and intermittent ejection stability are further improved. Furthermore, when such ink was applied to an ink jet recording system, in which ink is ejected by the action of thermal energy, the wire breakage of a heater of a recording head was found to be more effectively suppressed. More specifically, it is sufficient that the mass ratio of the content (% by mass) of a compound of the general formula (II) to the content (mass) of glycerin with respect to the total mass of ink, in other words, a value of (the content of a compound of the general formula (II)/the content of glycerin) is set at 0.40 or more to 5.90 or less. In contrast, if the mass ratio is less than 0.40, the effect of improving sticking resistance and intermittent ejection stability may not be always sufficiently obtained. On the other hand, if the mass ratio exceeds 5.90, when such ink is applied to an ink jet recording system, in which ink is ejected by the action of thermal energy, and electric pulse is applied predetermined times, the wire of a heater of a recording head is sometimes broken. In short, recording durability may sometimes decrease.

(Compound Represented by the General Formula (III))

The ink of the present invention contains a compound of the general formula (I) previously described as a coloring material. According to the studies conducted by the present inventors, use of this coloring material in combination with a compound described below can provide an image having a more desirable color tone as magenta ink. Specifically, use of a compound represented by the following general formula (III), which is an anthrapyridone dye, in a predetermined mass ratio as described below can provide an image having a more desirable color tone as magenta ink.

alkyl can be particularly used. Furthermore, alkyl may be substituted with hydroxy at any position; however, an alkyl substituted with hydroxy at an end, for example, a 2-hydroxyethyl group, a 3-hydroxypropyl group and a 4-hydroxybutyl group can be particularly used.

As the monoalkylaminoalkyl group, a mono-C1 to C4 alkylamino-C1 to C4 alkyl group may be mentioned. Specifically, for example, a monomethylaminopropyl group and a monoethylaminopropyl group may be mentioned.

As the dialkylaminoalkyl group, a di-C1 to C4 alkylamino-C1 to C4 alkyl group may be mentioned. Specifically, for example, a dimethylaminopropyl group and a diethylaminoethyl group may be mentioned.

In the present invention, $R_z$(s) can be a hydrogen atom, an alkyl group or a cyclohexyl group, further can be a hydrogen atom or an alkyl group, and particularly can be a methyl group.

As the general formula (III), [F] is a linking group. As the linking group, for example, the following linking groups 1 to 7 may be mentioned. In linking groups 1 to 7, a bond marked with "*" is a bond of each of the nitrogen atoms. Nitrogen atoms are directly bonded to two different triazine rings, General Formula (III)

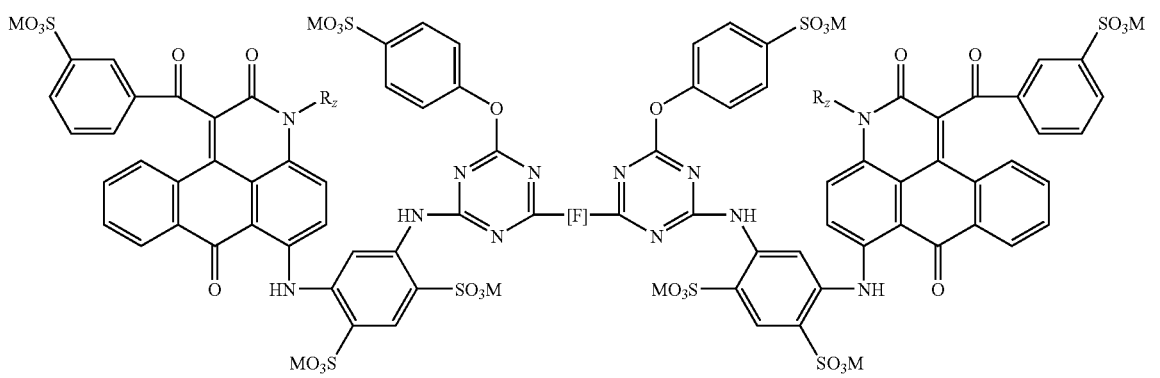

wherein, $R_z$(s) are each independently a hydrogen atom, an alkyl group, a hydroxyalkyl group, a cyclohexyl group, a monoalkylaminoalkyl group or dialkylaminoalkyl group. M(s) are each independently one selected from the group including a hydrogen atom, an alkali metal, ammonium and organic ammonium. [F] is a linking group.

In the general formula (III), $R_z$(s) are each independently a hydrogen atom, an alkyl group, a hydroxyalkyl group, a cyclohexyl group, a monoalkylaminoalkyl group or dialkylaminoalkyl group.

As the alkyl group, an alkyl group having 1 to 8 carbon atoms may be mentioned. Specifically, for example, a methyl group, an ethyl group, a n-propyl group, an iso-propyl group, a n-butyl group, a sec-butyl group, a t-butyl group, an iso-butyl group, a n-pentyl group, a n-hexyl group, a n-heptyl group and a n-octyl group may be mentioned.

As the hydroxyalkyl group, a hydroxyalkyl group having 1 to 4 carbon atoms may be mentioned. Specifically, a hydroxymethyl group, a hydroxyethyl group, a hydroxypropyl group and a hydroxybutyl group may be mentioned. As the alkyl of the hydroxyalkyl group, straight-chain, branched and cyclic alkyl may be mentioned; however, a straight-chain respectively. Of the linking groups, linking group 1 can be particularly used.

Linking group 1

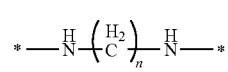

wherein, n is 2 to 8, can be 2 to 6 and further can be 2; and marks "*" are binding sites to two different triazine rings.

Linking group 2

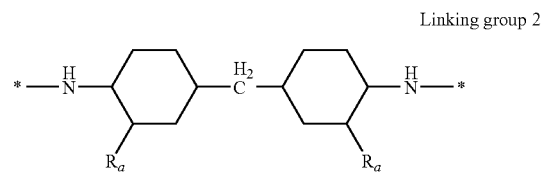

wherein, $R_a$(s) are each independently a hydrogen atom or a methyl group; and marks "*" are binding sites to two different 2 triazine rings.

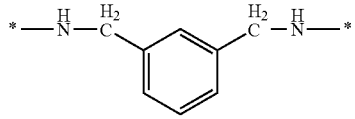
Linking group 3 wherein, marks "*" are binding sites to two different 2 triazine rings.

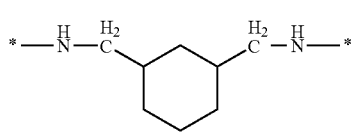
Linking group 4 wherein, marks "*" are binding sites to two different 2 triazine rings.

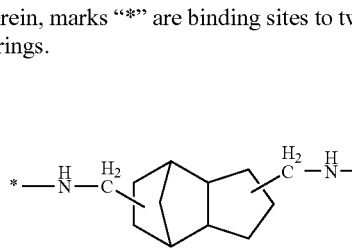
Linkage group 5 wherein, marks "*" are binding sites to two different 2 triazine rings.

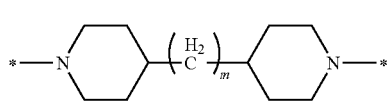
Linkage group 6 wherein, m is 2 to 4, marks "*" are binding sites to two different 2 triazine rings.

Linkage group 7 wherein, marks "*" are binding sites to two different 2 triazine rings.

In the general formula (III), M(s) are each independently one selected from the group including a hydrogen atom, an alkali metal, ammonium and organic ammonium. As the alkali metal, for example, lithium, sodium and potassium may be mentioned. As the organic ammonium, for example, acetamide, benzamide, methylamino, butylamino, diethylamino, triethanolamino and phenylamino may be mentioned.

In the general formula (III), the alkyl group can have 1 to 3 carbon atoms in view of solubility to an aqueous medium constituting ink, and specifically a methyl group, an ethyl group, a primary propyl group and a secondary propyl group may be mentioned. Note that, when the number of carbon atoms of the alkyl group is 4 or more, the hydrophobicity of a coloring material increases, the coloring material may not be always dissolved in the aqueous medium constituting ink.

Specific examples of a compound represented by the general formula (III) that can be used include compounds III-1 and III-2 exemplified below. Note that, the compounds exemplified below are expressed in the form of free acid. As a matter of course, the present invention is not limited to the following compounds. Any compound may be used as long as the structure and definition of the compound fall within the range of those of the general formula (III). In the present invention, particularly, a compound III-1 of the exemplified compounds can be used.

Compound III-1

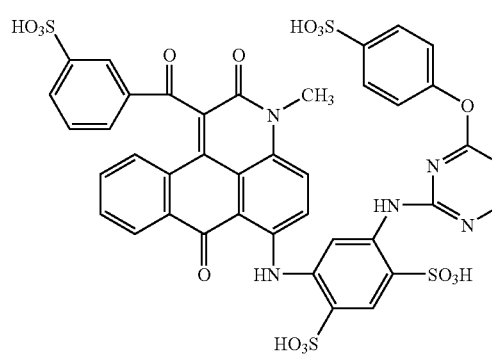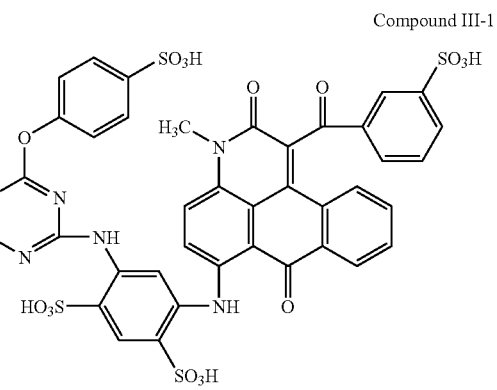

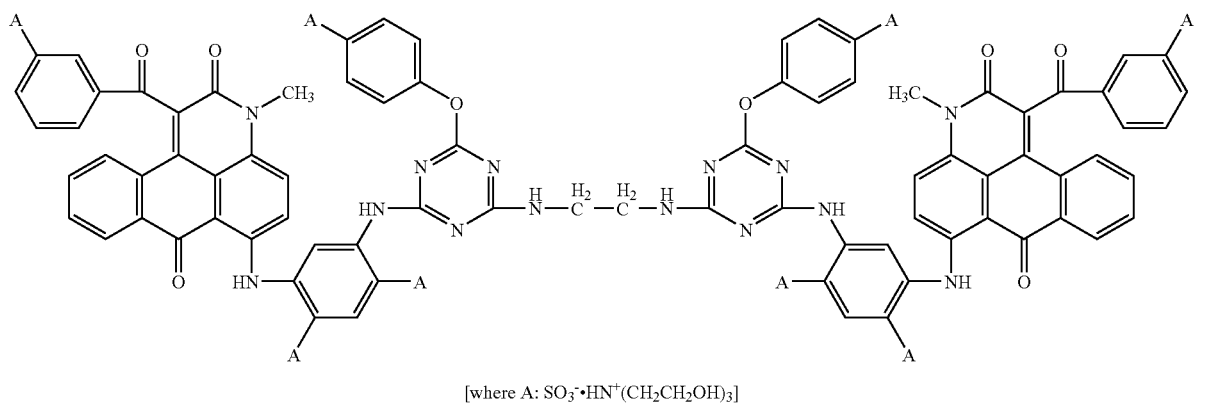

Compound III-2

[where A: SO$_3^-$·HN$^+$(CH$_2$CH$_2$OH)$_3$]

(Color Tone of Ink)

A compound of the general formula (I) has yellowish magenta color tone and characterized in that the compound provides an image having high optical density. On the other hand, a compound of the general formula (III) has bluish magenta color tone and characterized in that the compound provides an image having a low optical density. In the present invention, use of a compound of the general formula (I) and a compound of the general formula (III) having the aforementioned characteristics in a predetermined mass ratio can provide the magenta color tone that can be used.

The ink of the present invention has magenta color tone. More specifically, the color tone of magenta ink that can be used in the present invention is as follows. With respect to an image recorded by use of ink with a recording duty of 100%, a* and b* of the L*a*b* display system defined by the CIE (Commission Internationale de l'Eclairage (International Commission on Illumination)) are measured. On the basis of the obtained a* and b* values and the following equation (A), hue angle (H°) is calculated. Ink having a hue angle of 0 or more to 5 or less, or 350 or more to 360 or less is defined as ink having the color tone that can be particularly used as magenta ink in the present invention. Furthermore, the hue angle (H°) calculated on the basis of the following equation (A) can be particularly 0 or more to 5 or less. Note that the a* and b* values can be measured, for example, by spectrophotometer (trade name: Spectrolino; manufactured by Gretag Macbeth). As a matter of course, the present invention is not limited to this.

In $a^* \geq 0$, $b^* \geq 0$ (first quadrant), $H° = \tan^{-1}(b^*/a^*)$

In $a^* \leq 0$, $b^* \geq 0$ (second quadrant), $H° = 180 + \tan^{-1}(b^*/a^*)$ In $a^* \leq 0$, $b^* \leq 0$ (third quadrant), $H° = 180 + \tan^{-1}(b^*/a^*)$ In $a^* \geq 0$, $b^* \leq 0$ (fourth quadrant), $H° = 360 + \tan^{-1}(b^*/a^*)$   Equation (A)

(Content of Coloring Material)

In the present invention, the content (% by mass) of a compound of the general formula (I) in ink can be 0.1% by mass or more to 10.0% by mass or less with respect to the total mass of the ink, and further can be 0.5% by mass or more to 2.0% by mass or less. Furthermore, as described above, when a compound of the general formula (I) and a compound of the general formula (III) are used in combination as a coloring material, more excellent results can be obtained. For this, the sum of the contents (% by mass) of these compounds can fall within the range of 4.0% by mass or more to 10.0% by mass or less with respect to the total mass of the ink. In contrast, when the sum of the contents of color materials in ink is less than 4.0% by mass, a sufficient density of an image may not be always obtained. On the other hand, when the sum exceeds 15.0% by mass, sticking resistance may not be always sufficiently obtained. Note that, the content (% by mass) of a compound of the general formula (III) in ink is desirably 2.5% by mass or more to 10.0% by mass or less with respect to the total mass of the ink.

Furthermore, when a compound of the general formula (I) and a compound of the general formula (III) are used in combination as a color material, in order to obtain ink providing an image having the color tone that can be particularly used as magenta ink, as described above, the mass ratio of these compounds is desirably set at as follows: the content (% by mass) of a compound of the general formula (III) to the content (% by mass) of a compound of the general formula (I) with respect to the total mass of ink, can be 2.5 or more to 10.0 or less i.e., {(the content of a compound of the general formula (III)/(the content of a compound of the general formula (I))}=2.5 or more to 10.0 or less.

(Verification Method of Coloring Material)

To verify whether the coloring material to be used in the present invention is contained in ink or not, verification methods (1) to (3) below using high performance liquid chromatography (HPLC) can be applied.

(1) Peak retention time
(2) Maximum absorption wavelength of the peak (1)
(3) M/Z(posi) and M/Z(nega) of mass spectrum of the peak (1)

The analysis conditions of high performance liquid chromatography are as shown below. First, diluted liquid (ink) with pure water to about 1,000 folds was prepared as a sample to be subjected to measurement. Analysis was performed by high performance liquid chromatography in the following conditions and peak retention time and the maximum absorption wavelength of the peak were measured.

Column: SunFire C$_{18}$(manufactured by Japan Waters), 2.1 mm×150 mm, column temperature: 40° C.
Flow rate: 0.2 mL/min
PDA: 200 nm to 700 nm
Mobile phase and gradient conditions: Table 1

TABLE 1

| Mobile phase and gradient conditions | | | | |
|---|---|---|---|---|
| | 0-5 minutes | 5-24 minutes | 24-31 minutes | 31-45 minutes |
| A: Water | 85% | 85%→45% | 45%→0% | 0% |
| B: Methanol | 10% | 10%→50% | 50%→95% | 95% |
| C: 0.2 mol/L aqueous ammonium acetate solution | 5% | 5% | 5% | 5% |

Furthermore, mass spectrum analysis conditions are as shown below. With respect to the obtained peak, a mass spectrum thereof is measured in the following conditions and values of the M/Z (posi) and M/Z (nega) most intensively detected are obtained, respectively.

Ionization method
ESI
Capillary: 3.5 kV
Solvent-removing gas: 300° C.
Ion-source temperature: 120° C.
Detector
posi: 40 V 200 to 1500 amu/0.9 sec
nega: 40 V 200 to 1500 amu/0.9 sec Using the aforementioned method and under the aforementioned conditions, representative examples of individual coloring materials, that is, a compound I-46, which is a specific example of the compound of the general formula (I), and a compound III-1, which is a specific example of the compound of the general formula (III), were measured. As a result, the retention time, maximum absorption wavelength, M/Z (posi) and M/Z (nega) values as shown in Table 2 were obtained. This means that when unknown ink is measured by the same method and under the same conditions as above and the analysis results correspond to those shown in Table 2, the unknown ink is determined as ink containing a compound corresponding to the compound defined in the present invention.

TABLE 2

| Analysis results | | | | |
|---|---|---|---|---|
| | Retention time | Maximum absorption wavelength | M/Z | |
| | [minutes] | [nm] | posi | nega |
| Compound I-46 | 34.0-35.0 35.0-36.0 | 545-565 545-565 | 1176-1179 1176-1179 | 1174-1177 1174-1177 |
| Compound III-1 | 18.0-19.0 | 500-520 | 990-993 | 987-990 |

(Aqueous Medium)

Ink of the present invention can employ water or an aqueous medium, which is a solvent mixture of water and a water-soluble organic solvent. As water, deionized water (ion exchange water) can be used. The content (% by mass) of water in ink can be 10.0% by mass or more to 90.0% by mass or less with respect to the total mass of the ink.

The water-soluble organic solvent is not particularly limited as long as it is soluble in water, and an alcohol, a polyhydric alcohol, a polyglycol, glycol ether, a nitrogen-containing polar solvent and a sulfur-containing polar solvent and the like may be used. The content (% by mass) of the water-soluble organic solvent in ink can be 5.0% by mass or more to 90.0% by mass or less with respect to the total mass of the ink, and further can be 10.0% by mass or more to 50.0% by mass or less. When the water-soluble organic solvent is less than the aforementioned range, reliability such as ejection stability of ink may not be always obtained when the ink is used in an ink jet recording apparatus. On the other hand, when the content of the water-soluble organic solvent is more than the aforementioned range, the viscosity of the ink increases, with the result that failure of ink supply may sometimes occur. Note that, the content of the water-soluble organic solvent includes the contents of a compound of the general formula (II) and glycerin.

Specific examples of the water-soluble organic solvent include the followings; C1 to C4 alkyl alcohols such as methyl alcohol, ethyl alcohol, n-propyl alcohol, iso-propyl alcohol, n-butyl alcohol, sec-butyl alcohol and tert-butyl alcohol; amides such as dimethyl formamide and dimethyl acetamide; ketones or ketone alcohols such as acetone and diacetone alcohol; ethers such as tetrahydrofuran and dioxane; polyalkylene glycols having weight average molecular weight of 200 to 1,000 such as polyethylene glycol and polypropylene glycol; glycols such as ethylene glycol, propylene glycol, butylene glycol, diethylene glycol, triethylene glycol and hexylene glycol; alkylene glycols having an alkylene group with 2 to 6 carbon atoms such as 1,5-pentanediol, 1,6-hexanediol, 2-methyl-1,3-propanediol, 3-methyl-1,5-pentanediol and 1,2,6-hexanetriol; alkylether acetates such as polyethylene glycol monomethyl ether acetate; alkyl ethers of a polyhydric alcohol such as ethylene glycol monomethyl (or ethyl) ether, diethylene glycol methyl (or ethyl) ether and triethylene glycol monomethyl (or ethyl) ether; N-methyl-2-pyrrolidone; 2-pyrrolidone and 1,3-dimethyl-2-imidazolidinone. As a matter of course, the present invention is not limited to these. These water-soluble organic solvents may be used alone or two or more types as needed.

(Other Additives)

The ink of the present invention may contain, other than the components mentioned above, water-soluble organic compounds solid at normal temperature including polyhydric alcohols such as trimethylolpropane and trimethylolethane and urea derivatives such as urea and ethylene urea, as needed. Furthermore, the ink of the present invention may contain various types of additives such as a surfactant, a pH conditioner, an antirust agent, an antiseptic agent, an antifungal agent, an antioxidant, a reducing inhibitor, an evaporation accelerator, a chelating agent and a water-soluble polymer, as needed.

<Other Types of Ink>

Furthermore, to record full-color images, the ink of the present invention can be used in combination with ink having different color tone from that of the ink of the present invention. The ink of the present invention can be used in combination with at least one type of ink selected from the group including black ink, cyan ink, magenta ink, yellow ink, red ink, green ink and blue ink. Also, the ink of the present invention can be used further in combination with ink having substantially the same color tone, so called light-color ink. As the coloring materials for these inks and light color ink that may be used, not only known dyes but also newly synthesized coloring materials may be mentioned.

<Ink Jet Recording Method>

The ink jet recording method of the present invention is an ink jet recording method in which recording is performed by ejecting ink according to an ink jet system and characterized in that the ink is the ink jet ink of the present invention described above. The ink jet recording method of the present invention can be applied, for example, to a recording method, in which ink is ejected by applying dynamic energy to the ink, and to a recording method, in which ink is ejected by applying thermal energy to the ink. Particularly, the ink jet recording method using thermal energy can be applied to the present invention.

<Ink Cartridge>

The ink cartridge of the present invention is an ink cartridge having an ink storage portion for storing ink and characterized in that the ink stored therein is the ink jet ink of the present invention described above.

<Recording Unit>

The recording unit of the present invention is a recording unit having an ink storage portion for storing ink and a recording head for ejecting ink and characterized in that the ink stored therein is the ink jet ink of the present invention described above. As examples of the recording unit of the present invention that can be used include a system in which the recording head applies thermal energy to ink according to recording signals, thereby ejecting ink. Furthermore, in the present invention, a more desirable effect can be obtained by a recording head having a liquid surface in contact with a heat generating unit, containing a metal and/or a metal oxide. Specific examples of the metal and/or the metal oxide constituting the liquid surface in contact with the heat generating unit include a metal such as Ta, Zr, Ti, Ni or Al or oxides of these metals.

<Ink Jet Recording Apparatus>

The ink jet recording apparatus of the present invention is an ink jet recording apparatus having an ink storage portion for storing ink and a recording head for ejecting ink and characterized in that the ink stored therein is the ink jet ink of the present invention described above. As examples of the ink jet recording apparatus of the present invention that can be used include a system in which the recording head applies thermal energy to ink according to recording signals to eject ink.

Next, a schematic structure of machinery portion of an ink jet recording apparatus according to the present invention will be described below. The ink jet recording apparatus includes a paper feed unit, a conveyance unit, a carriage unit, a paper discharge unit, a cleaning unit each named on the basis of the role of a mechanism, and a jacket which protects these units and contributes to design.

Figure 2:
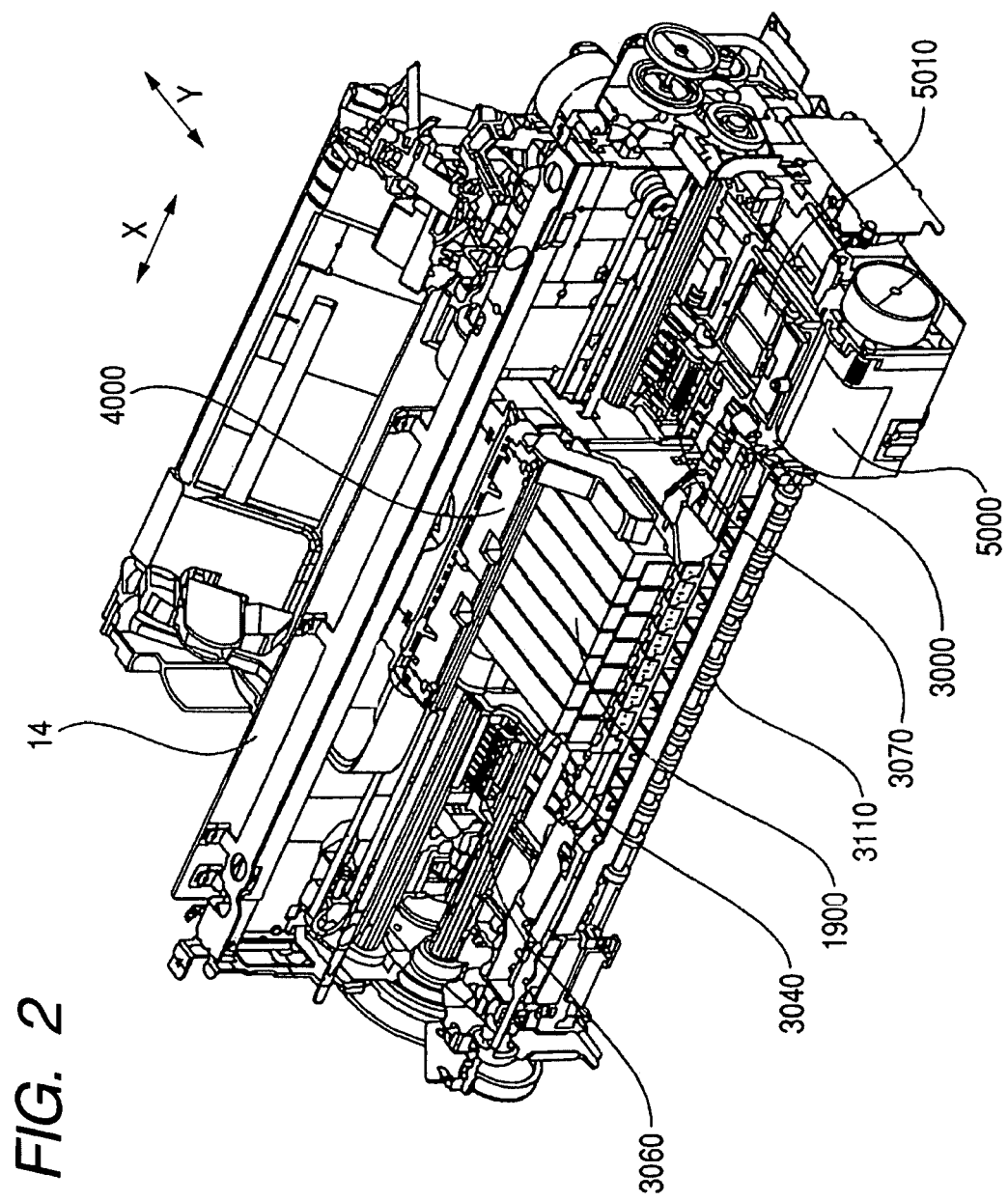
FIG. 2 is a perspective view of the machinery portion of the ink jet recording apparatus.
Figure 3:
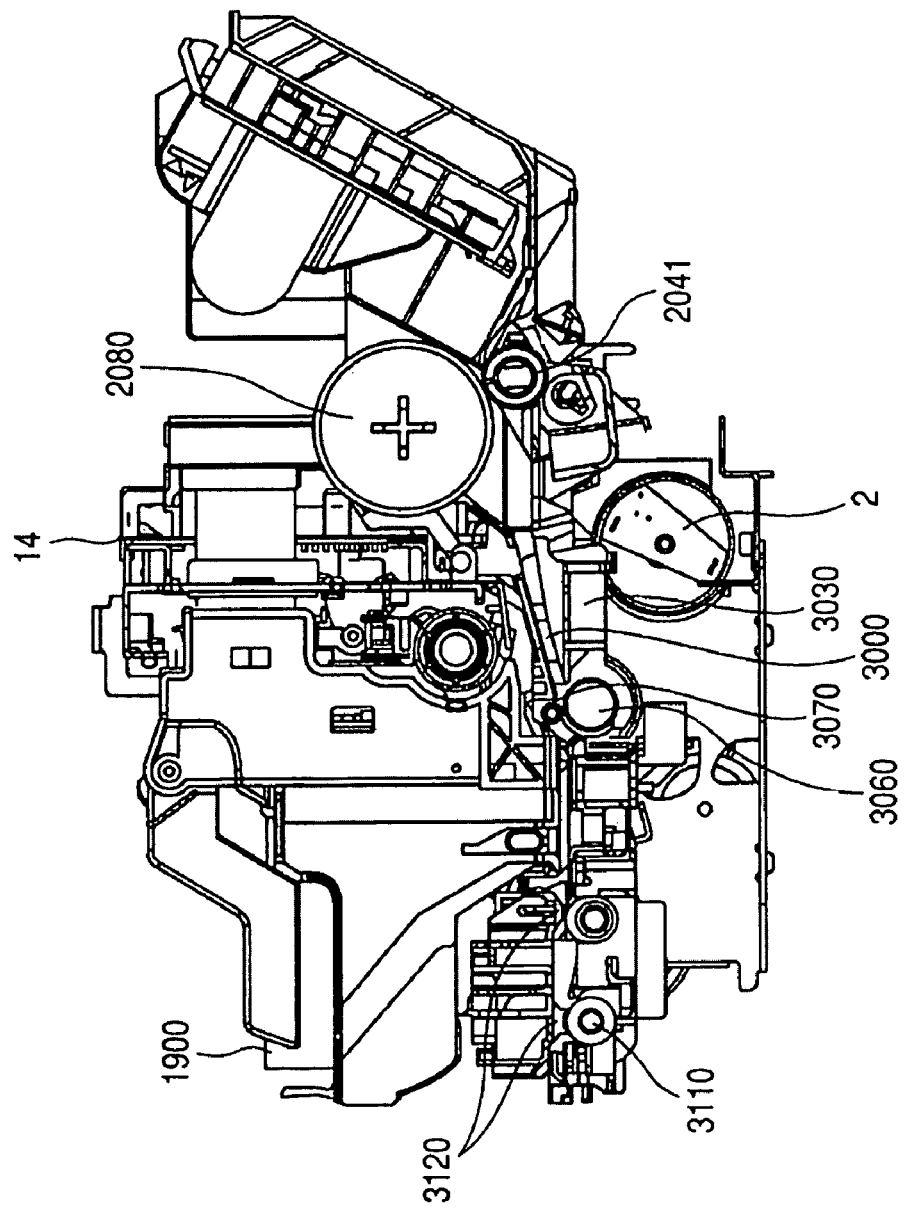
FIG. 3 is a sectional view of the ink jet recording apparatus.

FIG. 1 is a perspective view of an ink jet recording apparatus. Furthermore, FIG. 2 and FIG. 3 are views illustrating the interior mechanism of the ink jet recording apparatus. FIG. 2 illustrates a perspective view thereof as viewed from the upper right portion and FIG. 3 illustrates a longitudinal sectional view of the ink jet recording apparatus.

In feeding a paper-sheet, from a paper feed unit including a paper-feed tray 2060, only a predetermined number of recording mediums are sent to a nip unit including a paper-feed roller 2080 and a separation roller 2041. The recording medium is separated at the nip portion and the uppermost recording medium alone is conveyed. The recording medium conveyed to the conveyance unit is guided by a pinch roller holder 3000 and a paper guide flapper 3030 and conveyed to a pair of rollers, namely, a transfer roller 3060 and a pinch roller 3070. The pair of rollers, the transfer roller 3060 and pinch roller 3070, are driven by an LF motor 2 to rotate. By the rotation, the recording medium is transferred onto a platen 3040.

In recording an image on the recording medium, the recording head 1001 (FIG. 4; the detailed structure will be described later) is set at the position for recording a target image by the carriage unit and the recording head ejects ink to the recording medium according to signals from an electrical substrate 14. While recording is performed by the recording head 1001, the carriage 4000 moves in the row direction in a scanning manner (main scanning) and the recording medium is moved by the transfer roller 3060 in the line direction (sub scanning). By repeating the main scanning and the sub scanning alternately, an image is recorded on the recording medium. The recording medium on which the image is recorded is fed while being sandwiched by the nip of a first paper discharge roller 3110 and a spur 3120 in the paper discharge unit and discharged to the paper discharge tray 3160.

Note that, the cleaning unit cleans the recording head 1001 before and after recording an image. When a pump 5000 is actuated while the ejection port of the recording head 1001 is capped with a cap 5010, unnecessary ink is suctioned from the ejection port of the recording head 1001. Furthermore, remaining ink in the cap 5010 is suctioned while the cap 5010 is opened. In this manner, sticking and other malfunctions caused by the remaining ink can be prevented.

(Structure of Recording Head)

The structure of the head cartridge 1000 will be described. The head cartridge 1000 has the recording head 1001, a unit for installing an ink cartridge 1900 and a unit for supplying ink from the ink cartridge 1900 to the recording head, and is installed detachably in the carriage 4000.

Figure 4:
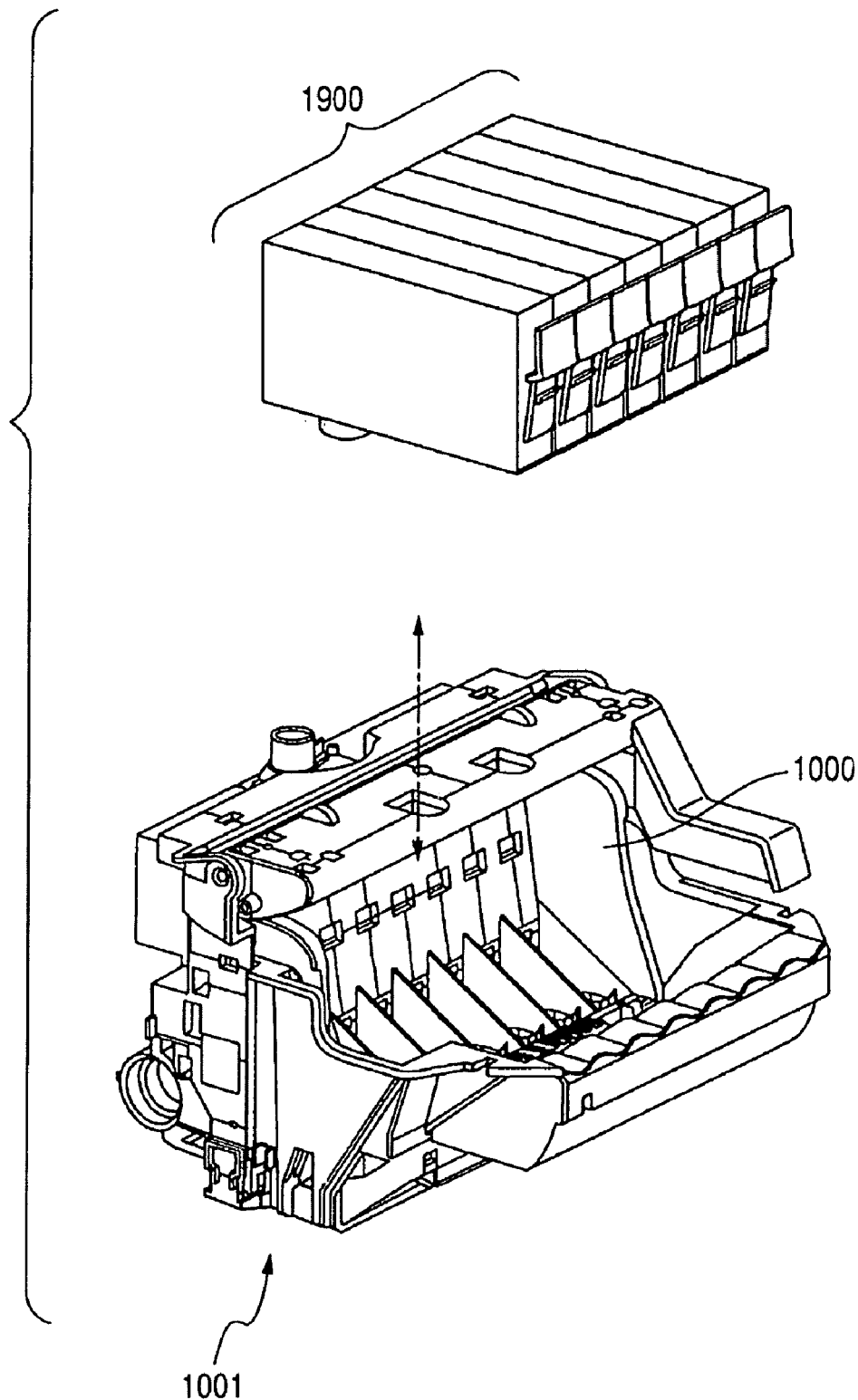
FIG. 4 is a perspective view illustrating how to install an ink cartridge in a head cartridge.

FIG. 4 is a view illustrating how to install the ink cartridge 1900 in the head cartridge 1000. The ink jet recording apparatus records an image by use of each of yellow, magenta, cyan, black, light magenta, light cyan and green ink. Accordingly, the ink cartridge 1900 has seven independent color sections. Note that, as at least one ink of the above constitution, the ink of the present invention is used. As illustrated in FIG. 4, individual ink cartridges are detachably attached to the head cartridge 1000. Note that, the ink cartridge 1900 can be attached/detached to the head cartridge 1000 installed in the carriage 4000.

Figure 5:
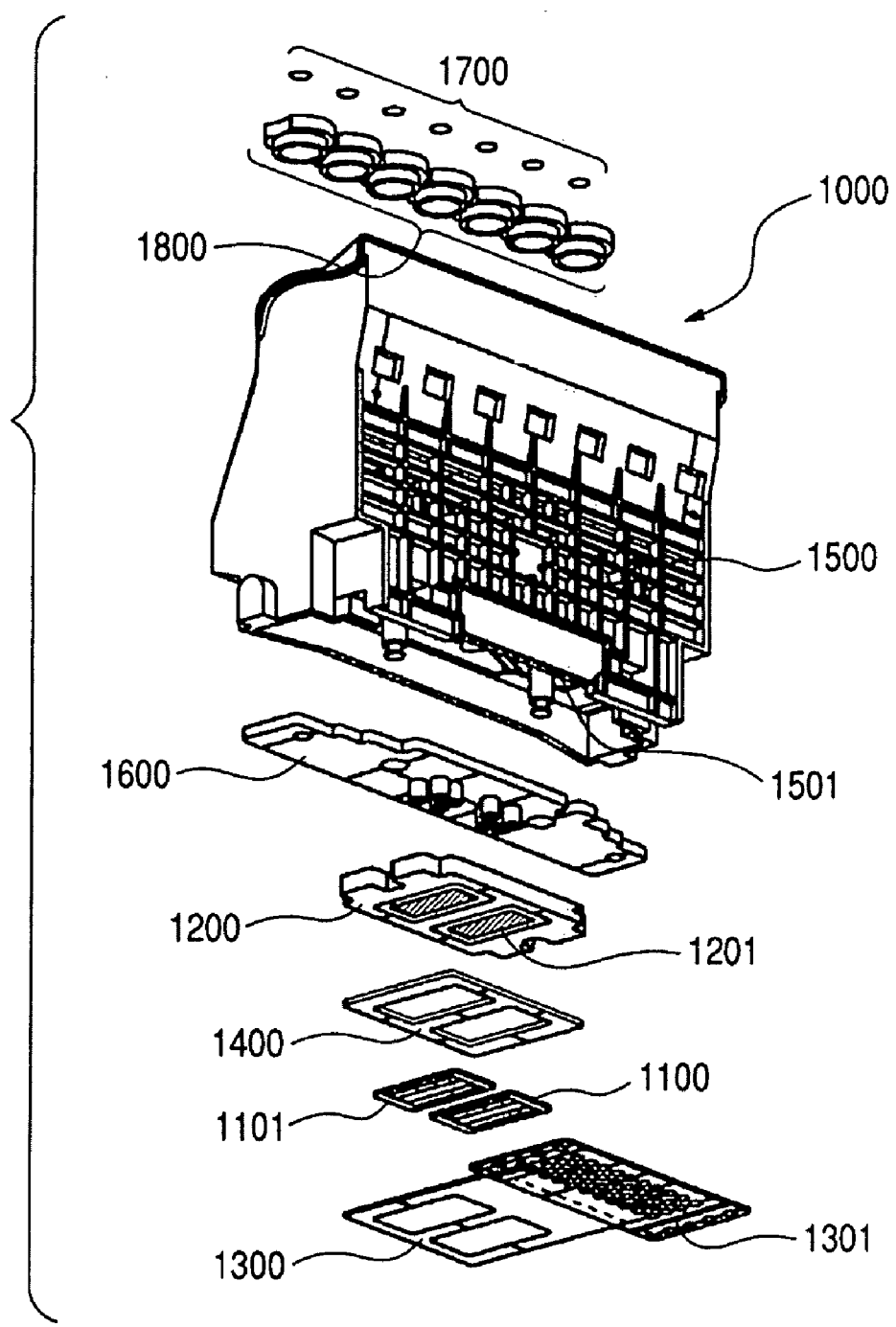
FIG. 5 is an exploded perspective view of the head cartridge.

FIG. 5 is an exploded perspective view of the head cartridge 1000. The head cartridge 1000 includes a recording element substrate, a plate, an electric wiring substrate 1300, a cartridge holder 1500, a flow-channel forming member 1600, a filter 1700, sealing rubber 1800, and so forth. The recording element substrate includes a first recording element substrate 1100 and a second recording element substrate 1101. The plate includes a first plate 1200 and a second plate 1400.

The first recording element substrate 1100 and the second recording element substrate 1101 are Si substrates. In one of the surfaces, a plurality of recording elements (nozzles) for ejecting ink are photolithographically formed. Electric wiring formed of Al for supplying electric power to each of the recording elements is formed by film-formation technique, and a plurality of ink flow channels corresponding to individual recording elements are formed by photolithography. Furthermore, ink supply ports for supplying ink to the ink flow channels are formed in the rear surface.

Figure 6:
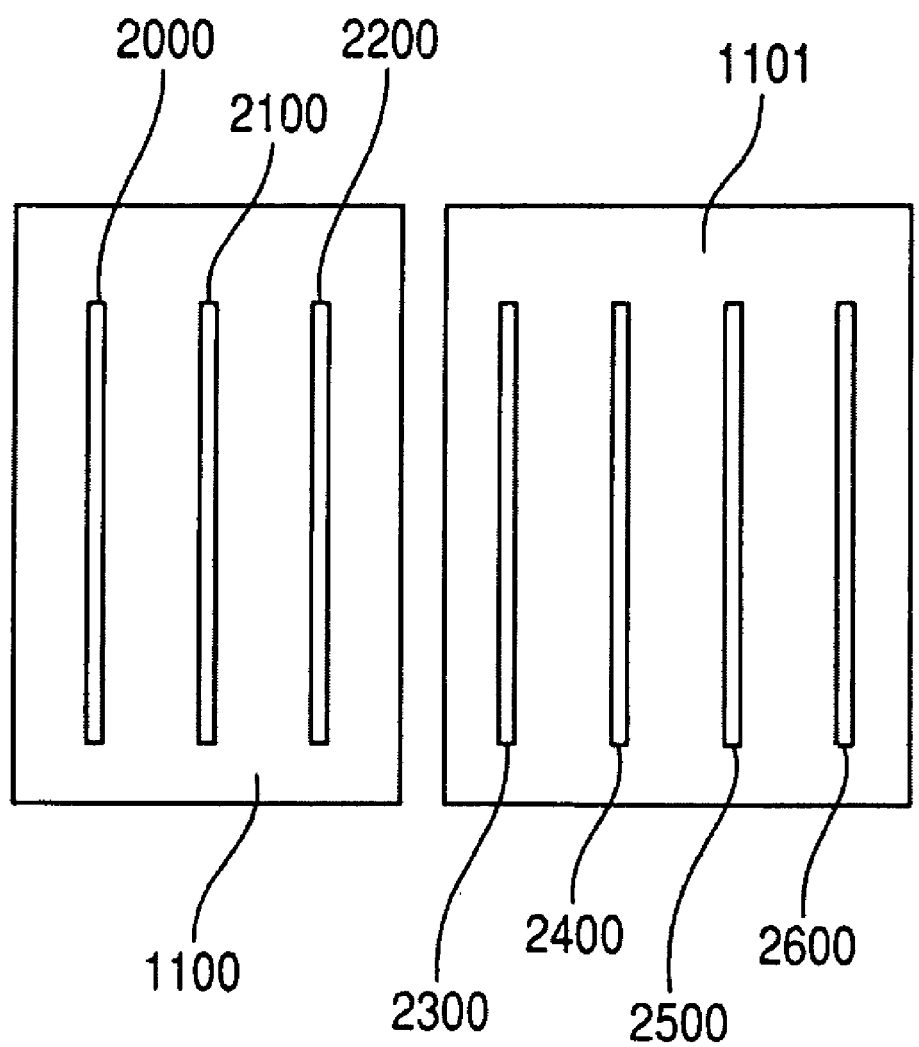
FIG. 6 is a front view of a recording element substrate of the head cartridge.

FIG. 6 is a magnified front view of the structure of the first recording element substrate 1100 and the second recording element substrate 1101. Reference numerals 2000 to 2600 represent recording elements corresponding to different colors of ink arranged in line (hereinafter also referred to as nozzle lines). In the first recording element substrate 1100, three color nozzle lines, namely, a yellow ink nozzle line 2000, a magenta ink nozzle line 2100 and a cyan ink nozzle line 2200, are formed. In the second recording element substrate 1101, four color nozzle lines, namely, a light cyan ink nozzle line 2300, a black ink nozzle line 2400, a green ink nozzle line 2500 and a light magenta ink nozzle line 2600, are formed.

Each nozzle line includes 768 nozzles arranged in the feed direction of the recording medium (sub scanning direction) at intervals of 1200 dpi (dot/inch; reference value) and ejects about 2 pico-liter of ink. The opening area of each ejection port is set at about 100 μm$^2$. In the present invention, in view of photo-quality, the nozzle can eject small droplets of ink having a volume 5 pL or less, further 2 pL or less. Furthermore, the size of the ejection port can be less than 10 μm. Furthermore, to simultaneously attain good photo-quality and high-speed recording, a plurality of nozzles (for example, 5 pL, 2 pL, 1 pL) for ejecting different volumes of ink can be used in combination.

Next, referring to FIG. 4 and FIG. 5, the following will be described. The first recording element substrate 1100 and the second recording element substrate 1101 are adhered and fixed onto the first plate 1200, in which ink supply ports 1201 are formed for supplying ink to the first recording element substrate 1100 and the second recording element substrate 1101. Furthermore, to the first plate 1200, a second plate 1400 having opening portions is adhered and fixed. The second plate 1400 holds the electric wiring substrate 1300 such that the electric wiring substrate 1300, the first recording element substrate 1100 and the second recording element substrate 1101 are electrically connected.

The electric wiring substrate 1300 applies electrical signals for ejecting ink from each of the nozzles formed in the first recording element substrate 1100 and the second recording element substrate 1101. The electric wiring substrate 1300 has electrical wirings corresponding to the first recording element substrate 1100 and the second recording element substrate 1101, and an external signal input terminal 1301 positioned at an end of the electrical wiring for receiving electrical signals from the ink jet recording apparatus. The external signal input terminal 1301 is positioned and fixed at the back surface of the cartridge holder 1500.

In the cartridge holder 1500 holding the ink cartridge 1900, the flow channel forming member 1600 is fixed, for example, by ultrasonic fusion to form an ink flow channel 1501 from the ink cartridge 1900 to the first plate 1200. At the end of the ink flow channel 1501 near the side at which the ink flow channel is engaged with the ink cartridge 1900, a filter 1700 is provided for preventing invasion of dust from the outside. Furthermore, at the engaged portion with the ink cartridge 1900, the sealing rubber 1800 is applied to prevent vaporization of ink from the engaged portion.

Furthermore, as mentioned above, the cartridge holder portion is connected to the recording head 1001 by adhesive to form the head cartridge 1000. Note that, the cartridge holder portion includes the cartridge holder 1500, the flow channel forming member 1600, the filter 1700 and the sealing rubber 1800. Furthermore, the recording head 1001 includes the first recording element substrate 1100, the second recording element substrate 1101, the first plate 1200, the electric wiring substrate 1300 and the second plate 1400.

Note that, the recording head described herein as an embodiment is the recording head of a thermal ink jet system, in which recording is performed by use of an electrothermal converter element (recording element), which produces thermal energy for causing film boiling of ink depending upon the electrical signal. The typical structure and principle thereof are disclosed, for example, in U.S. Pat. Nos. 4,723,129 and 4,740,796. This system can be applied not only to a so-called on-demand type but also a continuous type.

It is particularly effective to apply the thermal ink jet system to the on-demand type. In the case of the on-demand type, at least one driving signal, which provides a rapid increase of temperature exceeding nuclear boiling, corresponding to recording information, is applied to the electrothermal converters arranged so as to correspond to liquid flow channels for holding ink. In this way, thermal energy is generated from the electrothermal converter and causes film boiling of ink, with the result that an air foam corresponding to the driving signal on one-on-one level can be formed in the ink. Ink is ejected through the ejection port due to the growth and shrinkage of air foam, thereby forming at least one droplet. Use of a pulse form as the driving signal can rapidly and appropriately grow or contract foams and consequently can eject ink with particularly excellent responsibility.

Furthermore, the ink of the present invention can be used not only in an ink jet recording apparatus for the thermal ink jet system but also in an ink jet recording apparatus using dynamic energy as described below. The ink jet recording apparatus according to the embodiment includes a nozzle forming substrate having a plurality of nozzles, pressure generating elements arranged so as to face the nozzles and formed of a piezoelectric material and a conductive material, and ink supplied around the piezoelectric materials. Voltage is applied to displace the piezoelectric elements to eject ink from the nozzles.

The ink jet recording apparatus is not limited to the apparatus having a recording head and an ink cartridge separately arranged as described above. The apparatus in which they are unseparately integrated into one body may be used. Furthermore, the ink cartridge may be separately arranged with the recording head or unseparately integrated with the recording head into one body and installed in the carriage, and further provided to a predetermined site of the ink jet recording apparatus and supplies ink through an ink supply member such as a tube to the recording head. Furthermore, when a structure for applying a desirable negative pressure to the recording head is provided to the ink cartridge, the following structure may be employed. That is, the structure in which an absorber is arranged in the ink storage portion of the ink cartridge or the structure in which a flexible ink storage bag and a spring unit for applying urge force in the direction of expanding the inner volume may be employed. Furthermore, the ink jet recording apparatus may employ a serial-type recording system. Besides this, the apparatus may employ a line-printer system in which recording elements are arranged in line over the entire width of the recording medium.

EXAMPLES

The present invention will now be described in detail below with reference to examples and comparative examples. The present invention is not limited by the following examples as long as the present invention does not go beyond the scope of the invention. Note that, unless otherwise specified, the units of ink components of Examples and Comparative examples are "parts by mass". Furthermore, the term "parts" and the symbol "%" in the description below are on the basis of mass, unless otherwise specified.

<Preparation of Coloring Material>

(Synthesis of Compound I-46)

As the compound I-46, a dye (lithium salt) synthesized according to Example 1 of Japanese Patent Application Laid-Open No. 2006-143989 was used.

(Synthesis of compound III-1)

(A) To xylene (360 parts), a compound (94.8 parts) of the following formula (1), sodium carbonate (3.0 parts) and ethyl benzoyl acetate (144.0 parts) were sequentially added while stirring. A reaction was performed for eight hours by increasing the temperature of the liquid to 140 to 15° C. while removing ethanol and water generated during the reaction out of the reaction system by azeotropic distillation with xylene. After the reaction was terminated, the reaction liquid was cooled to a temperature of 30° C. To the reaction liquid, methanol (240 parts) was added and stirred for 30 minutes. The resultant precipitated solid substance was obtained by filtration. The obtained solid substance was washed with methanol (360 parts), and then dried to obtain a compound (124.8 parts) of the following formula (2) as a light yellow needle-like crystal.

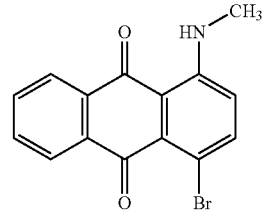

Formula (1)

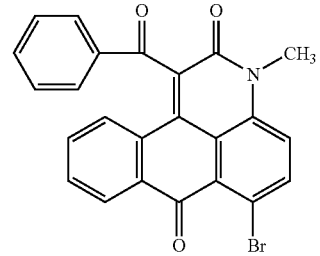

Formula (2)

(B) To N,N-dimethylformamide (300.0 parts), the compound of the formula (2) (88.8 parts) obtained above, meta-aminoacetanilide (75.0 parts), copper acetate monohydrate (24.0 parts) and sodium carbonate (12.8 parts) were sequentially added while stirring. Then, a reaction was performed for three hours by increasing the temperature of the liquid to 120 to 130° C. The reaction liquid was cooled to about 50° C. and methanol (120 parts) was added and stirred for 30 minutes. The resultant precipitated solid substance was obtained by filtration. The obtained solid substance was washed with methanol (500 parts), subsequently with warm water of 80° C., and then dried to obtain a compound (79.2 parts) of the following formula (3) as a bluish red crystal.

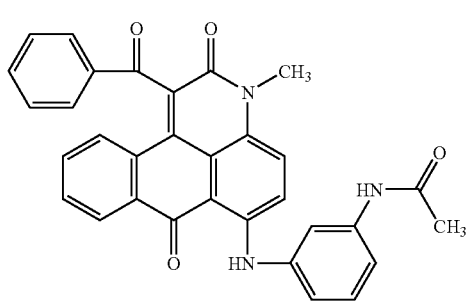

Formula (3)

(C) To 98% sulfuric acid (130 parts), 28% fuming sulfuric acid (170 parts) was added while cooling by water and while stirring to prepare a 12% fuming sulfuric acid (300 parts). While cooling by water, the compound (51.3 parts) of the formula (3) was added to this at temperature of 50° C. or less. Thereafter, the temperature of the liquid was increased to 85 to 90° C. and a reaction was performed for four hours. The reaction liquid was added to ice water (600 parts) while suppressing the temperature of the liquid from increasing by the generated heat by adding ice, thereby maintaining the temperature of the liquid at 40° C. or less. Next, water was added to the reaction liquid to obtain a liquid volume of 1,000 parts and filtration was performed to remove non-dissolved substances. To the mother liquid thus obtained, warm water was added up to 1,500 parts. While the liquid was maintained at a temperature of 60 to 65° C., sodium chloride (300 parts) was added and stirred for two hours. The precipitated crystal was obtained by filtration. The obtained crystal was washed with a 20% aqueous sodium chloride solution (300 parts) and sufficiently drained to obtain a wet cake (100.3 parts) containing a compound (59.2 parts) of the following formula (4) as a red crystal.

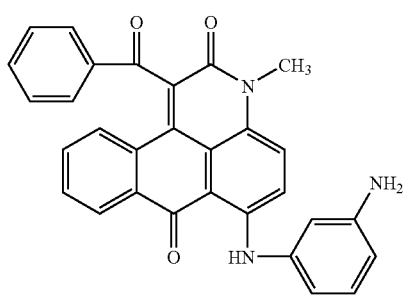

Formula (4)

(D) To water (60 parts), the wet cake (67.7 parts) of the compound of the formula (4) obtained above was added. Next, to this, a 25% aqueous sodium hydroxide solution (24 parts) was added and stirred to dissolve the cake while adjusting the pH of the liquid to 3 to 4 by further adding the 25% aqueous sodium hydroxide solution. On the other hand, to ice water (60 parts), Lipal OH (trade name, an anionic surfactant; manufactured by Lion Corporation)(0.4 parts) was added and further cyanul chloride (8.9 parts) was added. The mixture was stirred for 30 minutes to obtain a suspension solution. The obtained suspension solution was added to the solution containing the compound of the formula (4) obtained above. A reaction was performed at 25 to 30° C. for four hours while maintaining the pH of the liquid at 2.7 to 3.0 by use of a 10% aqueous sodium hydroxide solution to obtain a reaction liquid containing a compound of the following formula (5).

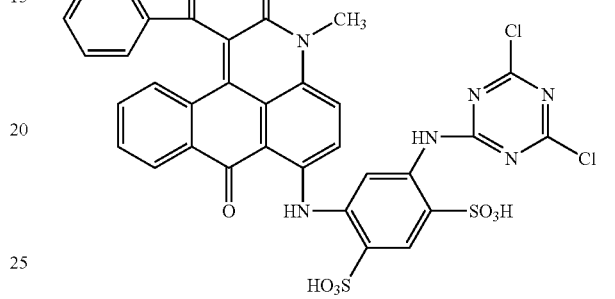

Formula (5)

(E) To the reaction liquid containing the compound of the formula (5) obtained above, sodium p-phenol sulfonate dihydrate (9.5 parts) was added. Subsequently, while maintaining the pH of the liquid at 6.5±0.3 by adding a 25% aqueous sodium hydroxide solution to this, the temperature of the liquid was increased to 50 to 55° C. and a reaction was performed at the temperature for one hour to obtain a reaction liquid containing a compound of the following formula (6).

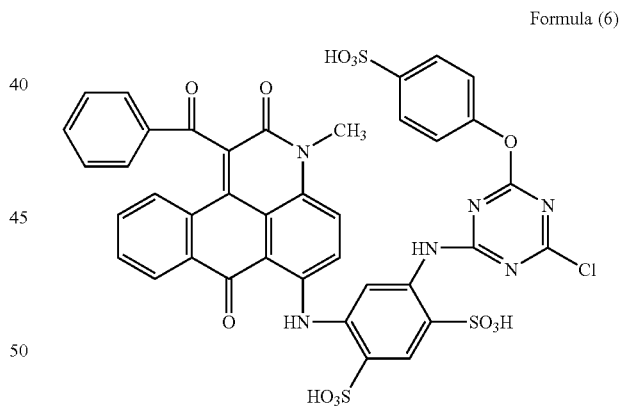

Formula (6)

(F) To the reaction liquid containing the compound of the formula (6) obtained above, ethylenediamine (1.2 parts) was added. Subsequently, while maintaining the pH of the liquid at 7.8 to 8.2 by adding a 25% aqueous sodium hydroxide solution to this, the temperature of the liquid was increased to 78 to 82° C. and a reaction was performed at the temperature for one hour. Thereafter, water was added up to a liquid volume of about 350 parts and filtration was performed to remove non-dissolved substances. To the mother liquid, water was added up to a liquid volume of 400 parts. While the temperature of the liquid was maintained at 55±2° C., concentrated hydrochloric acid was added to adjust the pH of the liquid to 3. Subsequently, to the liquid, sodium hydrochloride (40 parts) was added for 15 minutes and stirred for 30 minutes, and further concentrated hydrochloric acid was added to adjust the pH of the liquid to 2. The resultant acidic aqueous solution was stirred for one hour and the precipitated crystal was obtained by filtration. The crystal thus obtained was washed with a 20% aqueous sodium chloride solution (100 parts) to obtain a red wet cake containing the compound III-1 previously mentioned.

(G) The wet cake obtained above was added to methanol (500 parts). The liquid was increased to a temperature of 60 to 65° C. and stirred for one hour. The precipitated crystal was obtained by filtration, washed with methanol and dried to obtain the compound III-1 in the form of free acid. The compound III-1 in the form of free acid thus obtained was converted into a sodium salt thereof by a general ion exchange method.

<Preparation of Ink>

Using the exemplified compounds I-46 and III-1 which are coloring materials obtained above, and C.I. Direct Red 227, C.I. Direct Red 52, C.I. Direct Blue 199, C.I. and Acid Yellow 23, inks were individually prepared as follows. First, the components shown in the upper columns of Tables 3 and 4 below were each mixed and sufficiently stirred. Thereafter, the mixture was filtrated under pressure by a filter having a pore size of 0.2 μm to prepare inks according to Examples and Comparative Examples. Note that, main characteristics of each ink are also shown in the lower columns of Tables 3 and 4.

TABLE 3

Composition of ink and main characteristics
(Unit of components shown in the upper columns: %)

| | Example | | | | |
|---|---|---|---|---|---|
| | 1 | 2 | 3 | 4 | 5 |
| Compound I-46 | 4.0 | 4.0 | 4.0 | 4.0 | 4.0 |
| Compound III-1 | | | | | |
| Bis(2-hydroxyethyl)sulfone | 0.9 | 1.0 | 30.0 | 30.5 | 25.0 |
| Glycerin | | | | | |
| 2-pyrrolidone | 7.0 | 7.0 | | | |
| Urea | | | | | |
| Diethylene glycol | | | | | |
| Triethylene glycol | | | | | |
| 1,5-pentanediol | 10.0 | 10.0 | | | |
| Acetylenol E100 (*2) | 0.8 | 0.8 | 0.8 | 0.8 | 0.8 |
| Water | 77.3 | 77.2 | 65.2 | 64.7 | 70.2 |
| Content A of compound of general formula (II) [% by mass] | 0.9 | 1.0 | 30.0 | 30.5 | 25.0 |
| Content B of glycerin [% by mass] | 0.0 | 0.0 | 0.0 | 0.0 | 0.0 |
| A + B value | 0.9 | 1.0 | 30.0 | 30.5 | 25.0 |
| A/B value | — | — | — | — | — |

| | Example | | | | | |
|---|---|---|---|---|---|---|
| | 6 | 7 | 8 | 9 | 10 | 11 |
| Compound I-46 | 4.0 | 4.0 | 4.0 | 4.0 | 4.0 | 4.0 |
| Compound III-1 | | | | | | |
| Bis(2-hydroxyethyl)sulfone | 6.0 | 4.0 | 3.0 | 6.0 | 10.0 | 6.0 |
| Glycerin | 0.9 | 3.0 | 5.0 | 5.0 | 5.0 | 2.0 |
| 2-pyrrolidone | 5.0 | 7.0 | 7.0 | 5.0 | 5.0 | 7.0 |
| Urea | | | | | | |
| Diethylene glycol | | | | | | |
| Triethylene glycol | | | | | | |
| 1,5-pentanediol | 5.0 | 10.0 | 10.0 | 5.0 | 5.0 | 10.0 |
| Acetylenol E100 (*2) | 0.8 | 0.8 | 0.8 | 0.8 | 0.8 | 0.8 |
| Water | 78.3 | 71.2 | 70.2 | 74.2 | 70.2 | 70.2 |

TABLE 3-continued

Composition of ink and main characteristics
(Unit of components shown in the upper columns: %)

| Content A of compound of general formula (II) [% by mass] | 6.0 | 4.0 | 3.0 | 6.0 | 10.0 | 6.0 |
|---|---|---|---|---|---|---|
| Content B of glycerin [% by mass] | 0.9 | 3.0 | 5.0 | 5.0 | 5.0 | 2.0 |
| A + B value | 6.9 | 7.0 | 8.0 | 11.0 | 15.0 | 8.0 |
| A/B value | 6.67 | 1.33 | 0.60 | 1.20 | 2.00 | 3.00 |

| | Example | | | | | |
|---|---|---|---|---|---|---|
| | 12 | 13 | 14 | 15 | 16 | 17 |
| Compound I-46 | 4.0 | 4.0 | 4.0 | 4.0 | 4.0 | 4.0 |
| Compound III-1 | | | | | | |
| Bis(2-hydroxyethyl)sulfone | 19.0 | 18.5 | 6.0 | 3.0 | 2.3 | 6.4 |
| Glycerin | 4.0 | 5.0 | 20.5 | 8.0 | 5.9 | 16.0 |
| 2-pyrrolidone | 5.0 | | 5.0 | 5.0 | 7.0 | 5.0 |
| Urea | | | | | | |
| Diethylene glycol | | | | | | |
| Triethylene glycol | | | | | | |
| 1,5-pentanediol | 5.0 | | 5.0 | 5.0 | 10.0 | 5.0 |
| Acetylenol E100 (*2) | 0.8 | 0.8 | 0.8 | 0.8 | 0.8 | 0.8 |
| Water | 62.2 | 71.7 | 58.7 | 74.2 | 70.0 | 62.8 |
| Content A of compound of general formula (II) [% by mass] | 19.0 | 18.5 | 6.0 | 3.0 | 2.3 | 6.4 |
| Content B of glycerin [% by mass] | 4.0 | 5.0 | 20.5 | 8.0 | 5.9 | 16.0 |
| A + B value | 23.0 | 23.5 | 26.5 | 11.0 | 8.2 | 22.4 |
| A/B value | 4.75 | 3.70 | 0.29 | 0.38 | 0.39 | 0.40 |

| | Example | | | | | |
|---|---|---|---|---|---|---|
| | 18 | 19 | 20 | 21 | 22 | 23 |
| Compound I-46 | 4.0 | 4.0 | 4.0 | 1.5 | 1.5 | 1.5 |
| Compound III-1 | | | | 4.5 | 4.5 | 4.5 |
| Bis(2-hydroxyethyl)sulfone | 17.7 | 19.7 | 13.8 | 10.0 | 10.0 | 10.0 |
| Glycerin | 3.0 | 3.3 | 2.3 | 5.0 | 5.0 | 5.0 |
| 2-pyrrolidone | 5.0 | 5.0 | 5.0 | 5.0 | | |
| Urea | | | | | 5.0 | |
| Diethylene glycol | | | | | 5.0 | 5.0 |
| Triethylene glycol | | | | | | 5.0 |
| 1,5-pentanediol | 5.0 | 5.0 | 5.0 | 5.0 | | |
| Acetylenol E100 (*2) | 0.8 | 0.8 | 0.8 | 0.8 | 0.8 | 0.8 |
| Water | 64.5 | 62.2 | 69.1 | 68.2 | 68.2 | 68.2 |
| Content A of compound of general formula (II) [% by mass] | 17.7 | 19.7 | 13.8 | 10.0 | 10.0 | 10.0 |
| Content B of glycerin [% by mass] | 3.0 | 3.3 | 2.3 | 5.0 | 5.0 | 5.0 |
| A + B value | 20.7 | 23.0 | 16.1 | 15.0 | 15.0 | 15.0 |
| A/B value | 5.90 | 5.97 | 6.00 | 2.00 | 2.00 | 2.00 |

(*2) Acetylene glycol ethylene oxide adduct (Surfactant; manufactured by Kawaken Fine Chemicals Co., Ltd.)

TABLE 4

Composition of ink and main characteristics
(Unit of components shown in the upper columns: %)

| | Comparative Example | | | | |
|---|---|---|---|---|---|
| | 1 | 2 | 3 | 4 | 5 |
| Compound I-46 | 4.0 | 4.0 | 4.0 | | |
| C.I. Direct Red 227 | | | | 5.0 | |
| C.I. Direct Red 52 | | | | | 10.0 |
| C.I. Direct Blue 199 | | | | | |
| C.I. Acid Yellow 23 | | | | | |
| Bis(2-hydroxyethyl)sulfone | | | | 30.0 | 5.0 |
| Glycerin | | | | | |
| 2-pyrrolidone | | | 7.0 | | |
| N-methyl-2-pyrrolidone | | | | | 10.0 |
| Ethylene urea | 30.5 | 23.5 | 0.9 | | |
| Diethylene glycol | | | | | |
| Polyethylene glycol (*1) | | | | | |
| 1,5-pentanediol | | | 10.0 | | |
| 1,6-hexanediol | | | | | |
| 1,2,6-hexanetriol | | | | | |
| Isopropyl alcohol | | | | 10.0 | |
| Trimethylol propane | | | | | |
| Ethylene glycol monomethyl ether | | | | | 10.0 |
| Tetraethylene glycol monobutyl ether | | | | | |
| Acetylenol E100 (*2) | 0.8 | 0.8 | 0.8 | 0.8 | 0.8 |
| Water | 64.7 | 71.7 | 77.3 | 54.2 | 64.2 |
| Content A of compound of general formula (II) [% by mass] | 0.0 | 0.0 | 0.0 | 30.0 | 5.0 |
| Content B of glycerin [% by mass] | 0.0 | 0.0 | 0.0 | 0.0 | 0.0 |
| A + B value | 0.0 | 0.0 | 0.0 | 30.0 | 5.0 |
| A/B value | — | — | — | — | — |

| | Comparative Example | | | | | |
|---|---|---|---|---|---|---|
| | 6 | 7 | 8 | 9 | 10 | 11 |
| Compound I-46 | | | | | | 5.0 |
| C.I. Direct Red 227 | | | | | | |
| C.I. Direct Red 52 | | | | | 5.0 | |
| C.I. Direct Blue 199 | 4.0 | 4.0 | | 5.0 | | |
| C.I. Acid Yellow 23 | | | 3.0 | 4.0 | | |
| Bis(2-hydroxyethyl)sulfone | 12.0 | 10.0 | 5.0 | 3.0 | | 5.0 |
| Glycerin | 2.0 | 14.0 | 13.0 | | 7.0 | |
| 2-pyrrolidone | | | | | | |
| N-methyl-2-pyrrolidone | | | | | | 10.0 |
| Ethylene urea | | | | | | |
| Diethylene glycol | | | | 9.0 | | |
| Polyethylene glycol (*1) | | | 10.0 | 3.0 | | |
| 1,5-pentanediol | | | | | | |
| 1,6-hexanediol | | 5.0 | | 7.0 | | |
| 1,2,6-hexanetriol | 7.0 | | | | | |
| Isopropyl alcohol | | | | | | |
| Trimethylol propane | | | 3.0 | | | |
| Ethylene glycol monomethyl ether | | | | | | 10.0 |
| Tetraethylene glycol monobutyl ether | | | | 9.0 | | |
| Acetylenol E100 (*2) | 0.8 | 0.8 | 0.8 | 0.8 | 0.8 | 0.8 |
| Water | 74.2 | 66.2 | 68.2 | 74.2 | 69.2 | 69.2 |
| Content A of compound of general formula (II) [% by mass] | 12.0 | 10.0 | 5.0 | 3.0 | 0.0 | 5.0 |
| Content B of glycerin [% by mass] | 2.0 | 14.0 | 13.0 | 0.0 | 7.0 | 0.0 |
| A + B value | 14.0 | 24.0 | 18.0 | 3.0 | 7.0 | 5.0 |
| A/B value | 6.00 | 0.71 | 0.38 | — | 0.00 | — |

(*1) Average molecular weight 200
(*2) Acetylene glycol ethylene oxide adduct (Surfactant; manufactured by Kawaken Fine Chemicals Co., Ltd.)

<Evaluation>

(1) Color Tone

Each of the inks obtained in the above was set at an ink jet recording apparatus (trade name: PIXUS iP8600; manufactured by Canon Inc.) using thermal energy. Recording conditions were set at as follows: temperature: 23° C., relative humidity: 55%, recording density: 2,400 dpi×1,200 dpi, ejection volume: 2.5 pL. An image was recorded on a recording medium (trade name: PR-101; manufactured by Canon Inc.) while changing the recording duty from 0% to 100% at 10% intervals. The image was allowed to naturally dry at a temperature of 23° C. and a relative humidity of 55% for 24 hours. In the recorded matter thus obtained, a portion of an image having a recording duty of 100% was measured for $a^*$ and $b^*$ of the $L^*a^*b^*$ display system defined by the CIE (Commission Internationale de l'Eclairage (International Commission on Illumination)) to evaluate color tone. Note that, $a^*$ and $b^*$ were measured by a spectrophotometer (Spectorolino; manufactured by Gretag Macbeth) in the conditions: light source: D50, field of vision: 2°. On the basis of the values of $a^*$ and $b^*$ thus obtained and the following equation (A), each of hue angles (H°) was calculated to evaluate color tone (hue angle). The evaluation criteria of color tone (hue angle) are as follows. The evaluation results are shown in Table 5. In the present invention, of the criteria below, B is ink having a color tone of magenta that can be used, A is ink having the color tone of magenta which can be particularly used and C is ink having unacceptable color tone of magenta.

In $a^* \geq 0$, $b^* \geq 0$ (first quadrant), $H° = \tan^{-1}(b^*/a^*)$

In $a^* \leq 0$, $b^* \geq 0$ (second quadrant), $H° = 180 + \tan^{-1}(b^*/a^*)$ In $a^* \leq 0$, $b^* \leq 0$ (third quadrant), $H° = 180 + \tan^{-1}(b^*/a^*)$ In $a^* \geq 0$, $b^* \leq 0$ (fourth quadrant), $H° = 360 + \tan^{-1}(b^*/a^*)$  Equation (A)

A: H° is 0 or more and 5 or less
B: H° is more than 5 and 50 or less, or 350 or more and less than 360
C: H° is more than 50 and less than 350

(2) Lightfastness

Each of the inks obtained in the above was set at an ink jet recording apparatus (trade name: PIXUS iP8600; manufactured by Canon Inc.) using thermal energy. Recording conditions were set at as follows: temperature: 23° C., relative humidity: 55%, recording density: 2,400 dpi×1,200 dpi, ejection volume: 2.5 pL. An image was recorded on a recording medium (trade name: PR-101; manufactured by Canon Inc.) while changing a recording duty from 0% to 100% at 10% intervals. The image was allowed to naturally dry at a temperature of 23° C. and a relative humidity of 55% for 24 hours. In the recorded. matter thus obtained, a portion of an image having a recording duty of 100% was measured for optical density (this is the "optical density before the test"). Furthermore, the recorded matter was exposed to light by use of a super xenon testing machine (trade name: SX-75; manufactured by Suga Test Instruments Co., Ltd.) in the conditions: irradiation intensity: 100 klux, inner vessel temperature: 24° C., relative humidity: 60%, for 168 hours. Thereafter, the portion of the image of the recorded matter having a recording duty of 100% was measured for optical density (this is the "optical density after the test"). Note that, the optical density was measured by a spectrophotometer (Spectorolino; manufactured by Gretag Macbeth) under the conditions: light source: D50, field of view: 2°. On the basis of the values of the optical density before the test and optical density after the test and the following equation, a residual optical density rate was calculated to evaluate lightfastness. The evaluation criteria of lightfastness are as follows. The evaluation results are shown in Table 5. In the present invention, of the criteria below, B is an acceptable level, A is an excellent level, and C is an unacceptable level because the degree of color fading of an image after the lightfastness test is large.

$$\text{Residual optical density rate}[\%] = \frac{\text{Optical density after test}}{\text{Optical density before test}} \times 100$$

A: Residual optical density rate is 80% or more
B: Residual optical density rate is 70% or more and less than 80%
C: Residual optical density rate is less than 70%

(3) Intermittent Ejection Stability

Each of the inks obtained in the above was set at an ink jet recording apparatus (trade name: PIXUS iP8600; manufactured by Canon Inc.) using thermal energy. The ink jet recording apparatus was allowed to stand under the environment of a temperature of 15° C. and a humidity of 10% RH, for five hours or more and ink was allowed to eject from a predetermined nozzle in the same environment. Thereafter, the nozzle was not used for a predetermined time and again ink was allowed to eject from the nozzle to record an image on a recording medium (trade name: HR-101; manufactured by Canon Inc.). The image thus obtained was visually observed to evaluate intermittent ejection stability. The evaluation criteria of intermittent ejection stability are as follows. The evaluation results are shown in Table 5. In the present invention, of the criteria below, C or more is defined as sufficient intermittent ejection stability, B as excellent intermittent ejection stability and A as particularly excellent intermittent ejection stability and D as an unacceptable level.

A: Normal recording was performed even after the nozzle was not used for five seconds
B: Normal recording was performed even after the nozzle was not used for three seconds
C: Slight deterioration of the recording quality was observed after the nozzle was not used for three seconds but no problem was posed
D: Ejection failure or irregular recording was observed after the nozzle was not used for three seconds (4) Sticking Resistance Each of the inks obtained in the above was set at an ink jet recording apparatus (trade name: PIXUS iP8600; manufactured by Canon Inc.) using thermal energy. After the ink jet recording apparatus was cleaned, a nozzle check pattern of PIXUS iP8600 was recorded. Thereafter, a power-source cable was pulled out while the carriage was moving to create the state where the recording head was not capped. While keeping this state, the ink jet recording apparatus was allowed to stand still in the environment of a temperature of 30° C. and a humidity of 10% RH for 14 days. Thereafter, the ink jet recording apparatus was allowed to stand in the environment of a temperature of 25° C. for six hours and returned to normal temperature. Then, recording was performed by the ink jet recording apparatus while cleaning it, sticking resistance was evaluated. The evaluation criteria of the sticking resistance are as follows. The evaluation results are shown in Table 5. In the present invention, of the criteria below, B or more is defined as sufficient sticking resistance, A as particularly excellent sticking resistance and C as an unacceptable level.

A: Normal recording was performed by performing a cleaning operation once or twice
B: Normal recording was performed by performing a cleaning operation 3 to 10 times
C: Normal recording was not performed by performing a cleaning operation 10 times or less (5) Recording Durability Each of the inks obtained in the above was set at an ink jet recording apparatus (trade name: PIXUS iP3100; manufactured by Canon Inc.) using thermal energy. After a predetermined number of electric pulses was applied to the heater of the recording head, a PIXUS iP3100 nozzle check pattern was recorded. The nozzle check pattern thus obtained was visually confirmed to evaluate recording durability. Note that if the nozzle check pattern obtained after application of the predetermined number of electric pulses is normally recorded, it was demonstrated that no wire breakage of the heater occurred. The evaluation criteria of the recording durability are as follows. The evaluation results are shown in Table 5. In the present invention, of the criteria below, B or more is defined as sufficient recording durability, A as particularly excellent heater durability and C as an unacceptable level.

A: No wire breakage of the heater occurred even if a pulse of $2.0 \times 10^8$ was applied
B: Wire breakage of the heater occurred by applying a pulse of $1.5 \times 10^8$ or more to $2.0 \times 10^8$ or less
C: Wire breakage of the heater occurred by applying a pulse of less than $1.5 \times 10^8$

TABLE 5

| | Evaluation results | | | | |
|---|---|---|---|---|---|
| | Color tone | Light-fastness | Recording durability | Sticking resistance | Intermittent ejection stability |
| Example 1 | B | B | B | B | B |
| Example 2 | B | A | B | B | B |
| Example 3 | B | A | B | B | B |
| Example 4 | B | A | B | B | C |
| Example 5 | B | A | B | B | B |
| Example 6 | B | A | B | A | B |
| Example 7 | B | A | B | A | B |
| Example 8 | B | A | A | A | A |
| Example 9 | B | A | A | A | A |
| Example 10 | B | A | A | A | A |
| Example 11 | B | A | A | A | A |
| Example 12 | B | A | A | A | A |
| Example 13 | B | A | B | A | B |
| Example 14 | B | A | B | A | B |
| Example 15 | B | A | B | A | A |
| Example 16 | B | A | A | A | B |
| Example 17 | B | A | A | A | A |
| Example 18 | B | A | A | A | A |
| Example 19 | B | A | A | A | B |
| Example 20 | B | A | B | A | A |
| Example 21 | A | A | A | A | A |
| Example 22 | A | A | A | A | A |
| Example 23 | A | A | A | A | A |
| Comparative Example 1 | B | C | B | B | D |
| Comparative Example 2 | B | C | B | B | C |
| Comparative Example 3 | B | C | B | B | C |
| Comparative Example 4 | B | C | C | B | D |
| Comparative Example 5 | B | C | B | C | C |
| Comparative Example 6 | C | C | A | B | B |
| Comparative | C | C | C | A | B |

TABLE 5-continued

Evaluation results

| | Color tone | Light-fastness | Recording durability | Sticking resistance | Intermittent ejection stability |
|---|---|---|---|---|---|
| Example 7 | | | | | |
| Comparative Example 8 | C | C | B | A | B |
| Comparative Example 9 | C | C | C | B | B |
| Comparative Example 10 | B | C | B | B | C |
| Comparative Example 11 | B | C | B | B | B |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-072277, filed Mar. 19, 2008, which is hereby incorporated by reference herein in its entirety.

What is claimed is:

1. An ink jet ink comprising:
a compound represented by the following general formula (I); and
a compound represented by the following general formula (II):

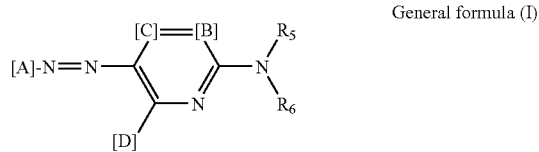

General formula (I)

wherein, in general formula (I), [A] is selected from the group consisting of (a) a 5-membered heterocyclic group, (b) a 5-membered heterocyclic group joined with an aliphatic ring, an aromatic ring, or a heterocyclic ring by condensation, and (c) a 5-membered heterocyclic group having a substituent; [B] and [C] are $CR_1$ and $CR_2$ or one of [B] and [C] is a nitrogen atom and the other is $CR_1$; and $R_5$ and $R_6$ are each independently a hydrogen atom or a substituent selected from the group consisting of an aliphatic group, an aromatic group, a heterocyclic group, an acyl group, an alkoxycarbonyl group, an aryloxycarbonyl group, a carbamoyl group, an alkylsulfonyl group, an arylsulfonyl group and a sulfamoyl group; a hydrogen atom of the substituent may be substituted; [D] as well as $R_1$ and $R_2$ that can partly constitute [B] and [C] in the formula are each independently a hydrogen atom or a substituent selected from the group consisting of a halogen atom, an aliphatic group, an aromatic group, a heterocyclic group, a cyano group, a carboxy group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, and a sulfonic acid group; a hydrogen atom of the substituent may be substituted and $R_1$ and $R_5$ or $R_5$ and $R_6$ may be joined to form a 5-membered ring or a 6-membered ring;

$$R_x\text{-[E]-}R_y \quad \text{General formula (II)}$$

wherein, in general formula (II), -[E]- is $-S(=O)_2-$; $R_x$ and $R_y$ are each independently one selected from the group consisting of a hydrogen atom, a hydroxyl group, an alkyl group, a hydroxyalkyl group, an alkenyl group, an acyl group, a carbamoyl group, a carboxy group and a sulfonyl group, with the proviso that $R_x$ and $R_y$ may not simultaneously be (1) hydrogen atoms, (2) hydroxyl groups, or (3) a hydrogen atom and a hydroxyl group.

2. The ink jet ink according to claim 1, wherein a content (% by mass) of a compound represented by the general formula (II) in the ink is in the range of 1.0% by mass to 30.0% by mass with respect to a total mass of the ink.

3. The ink jet ink according to claim 1, wherein the compound represented by the general formula (II) is bis(2-hydroxyethyl)sulfone.

4. The ink jet ink according to claim 1, further comprising glycerin.

5. The ink jet ink according to claim 4, wherein the sum of the content of the compound represented by the general formula (II) (% by mass) and the content of glycerin (% by mass) with respect to a total mass of the ink is 8.0% by mass to 23.0% by mass.

6. The ink jet ink according to claim 4, wherein the mass ratio of the content of the compound represented by the general formula (II) to the content of glycerin is in the range of 0.40 or more to 5.90 or less.

7. The ink jet ink according to claim 1, further comprising a compound represented by the following general formula (III), wherein the mass ratio of the content of the compound represented by the following general formula (III) to the content of the compound represented by the general formula (I) is 2.5 or more to 10.0 or less:

General Formula (III)

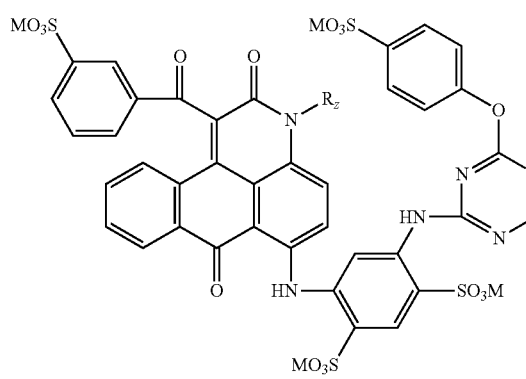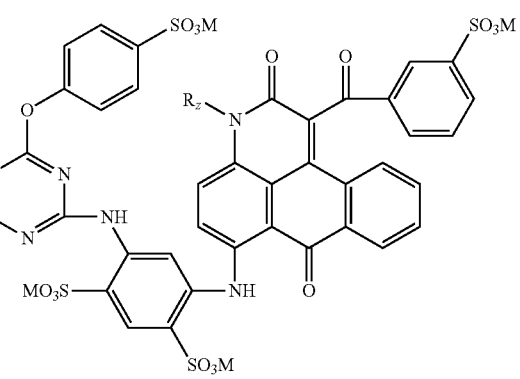

(III)

wherein, in general formula (III), $R_z$(s) are each independently a hydrogen atom, an alkyl group, a hydroxyalkyl group, a cyclohexyl group, a monoalkylaminoalkyl group or dialkylaminoalkyl group; M(s) are each independently one selected from the group consisting of a hydrogen atom, an alkali metal, ammonium and organic ammonium; and [F] is a linking group.

8. An ink jet recording method in which recording is performed by ejecting ink by an ink jet system, wherein the ink comprises the ink jet ink according to claim 1.

9. An ink cartridge comprising an ink storage portion for storing ink, wherein the ink comprises the ink jet ink according to claim 1.

10. A recording unit comprising an ink storage portion for storing ink and a recording head for ejecting ink, wherein the ink comprises the ink jet ink according to claim 1.

11. An ink jet recording apparatus comprising an ink storage portion for storing ink and a recording head for ejecting ink, wherein the ink comprises the ink jet ink according to claim 1.

* * * * *